(12) United States Patent
Krishnamurthi

(10) Patent No.: US 10,953,852 B1
(45) Date of Patent: Mar. 23, 2021

(54) PICK-UP AUTHENTICATION VIA AUDIBLE SIGNALS

(71) Applicant: GM CRUISE HOLDINGS LLC, San Francisco, CA (US)

(72) Inventor: Govindarajan Krishnamurthi, Palo Alto, CA (US)

(73) Assignee: GM Cruise Holdings, LLC., San Francisco, CA (US)

( * ) Notice: Subject to any disclaimer, the term of this patent is extended or adjusted under 35 U.S.C. 154(b) by 0 days.

(21) Appl. No.: 16/586,645

(22) Filed: Sep. 27, 2019

(51) Int. Cl.
| | |
|---|---|
| *B60R 25/24* | (2013.01) |
| *G05D 1/02* | (2020.01) |
| *H04W 4/44* | (2018.01) |
| *H04L 29/08* | (2006.01) |
| *B60R 25/10* | (2013.01) |

(52) U.S. Cl.
CPC .......... *B60R 25/24* (2013.01); *B60R 25/1003* (2013.01); *G05D 1/0276* (2013.01); *H04L 67/306* (2013.01); *H04W 4/44* (2018.02); *G05D 2201/0213* (2013.01)

(58) Field of Classification Search
CPC ..................................................... B60R 25/24
See application file for complete search history.

(56) References Cited

U.S. PATENT DOCUMENTS

| | | | |
|---|---|---|---|
| 8,149,850 B2 | 4/2012 | Krishnamurthi et al. | |
| 8,595,302 B2 | 11/2013 | Krishnamurthi et al. | |
| 9,008,628 B2 * | 4/2015 | Lichorowic | H04M 1/271 455/412.2 |
| 9,659,164 B2 | 5/2017 | Krishnamurthi | |
| 9,672,049 B2 | 6/2017 | Krishnamurthi | |
| 9,892,245 B2 | 2/2018 | Krishnamurthi | |
| 9,961,496 B2 | 5/2018 | Ahmadzadeh et al. | |
| 9,979,606 B2 | 5/2018 | Gupta et al. | |
| 10,025,938 B2 | 7/2018 | Krishnamurthi | |
| 10,154,048 B2 | 12/2018 | Krishnamurthi et al. | |
| 10,212,207 B2 * | 2/2019 | Albisu | H04L 65/1016 |
| 10,275,955 B2 | 4/2019 | Gupta et al. | |
| 10,305,888 B2 * | 5/2019 | Grosskopf | H04L 67/10 |
| 10,369,967 B2 * | 8/2019 | Sako | B60R 25/305 |
| 10,464,530 B2 * | 11/2019 | Falkson | B60R 25/257 |
| 10,515,289 B2 | 12/2019 | Krishnamurthi et al. | |
| 10,536,867 B2 | 1/2020 | Salajegheh et al. | |
| 10,647,297 B2 * | 5/2020 | Watanabe | B60R 25/241 |
| 2013/0159939 A1 | 6/2013 | Krishnamurthi | |
| 2016/0327596 A1 | 11/2016 | Salajegheh et al. | |
| 2017/0262293 A1 | 9/2017 | Krishnamurthi | |
| 2019/0072985 A1 | 3/2019 | Taveira et al. | |

FOREIGN PATENT DOCUMENTS

| | | |
|---|---|---|
| AU | 2017237721 A1 | 9/2017 |
| EP | 2253152 B1 | 2/2009 |
| WO | 2016140912 A1 | 9/2016 |
| WO | 2016178776 A1 | 11/2016 |

* cited by examiner

*Primary Examiner* — K. Wong
(74) *Attorney, Agent, or Firm* — Polsinelli P.C.

(57) ABSTRACT

An autonomous vehicle including a communication system in communication with a computing system. The computing system runs computer-executable instructions that may examine a profile of a passenger. The computer-executable instructions may include authenticating between the passenger and the autonomous vehicle through the communication system, such that the authenticating results in a successful authentication of a first audible authentication signal and a second audible authentication signal.

20 Claims, 16 Drawing Sheets

US 10,953,852 B1

PICK-UP AUTHENTICATION VIA AUDIBLE SIGNALS

BACKGROUND

An autonomous vehicle is a motorized vehicle that can operate without a human driver. Conventionally, since the autonomous vehicle lacks a driver, physical human-machine interfaces (HMIs) may be provided to assist a passenger in finding the autonomous vehicle, requesting supporting or information during a ride, and disembarking the autonomous vehicle safely. Exemplary HMIs may include a mechanical push-button, a touch-sensitive display, or the like. While such HMIs are well-suited for a large portion of the population, these HMIs may be sub-optimal for those with vision impairments for a variety of reasons. For example, a person with a visual impairment may have difficulty trying to locate the autonomous vehicle and verifying that the particular vehicle is the correct and/or intended vehicle that the person is looking for. As another example, a visually impaired passenger may have difficulty or concerns during the ride as to the route and direction of the vehicle, in which case such HMIs may lack the ability to provide the visually impaired passenger with desired support or information. Furthermore, upon disembarking from the autonomous vehicle may also prove to be difficult. Without the assistance of a driver to guide the passenger safely out of the autonomous vehicle, such HMIs may be sub-optimal for visually impaired passengers.

SUMMARY

The following is a brief summary of subject matter that is described in greater detail herein. This summary is not intended to be limiting as to scope of the claims.

Described herein are various technologies pertaining to enabling ridesharing and usage of an autonomous vehicle by a visually impaired passenger.

More specifically, the various technologies present a notification to the passenger based on a profile of the passenger, wherein the profile of the passenger specifies that the notification is to be provided audibly to the passenger (e.g., the passenger may have a visual impairment). Even more specifically, the various technologies present the notification when a successful authentication between the passenger and an autonomous vehicle occurs. Content of the notification is based on occurrence of the successful authentication. Because the content of the notification is based on the detection of divergence occurring, the notification can inform the visually impaired passenger of the fact that the autonomous vehicle is the intended autonomous vehicle that the passenger should be looking for. For instance, where the autonomous vehicle comes to a pickup location having multiple autonomous vehicles, the notification can include "the car is parked 100 feet to your right." In another instance, where the successful authentication has occurred, the notification can include "this is the correct vehicle, the doors have been unlocked so that you can get in."

In one example, an autonomous vehicle is configured to output a first authentication signal, while a user receives a second authentication signal from a server. The user may then verify that the two authentication signals are the matching authentication signals and notify the autonomous vehicle that the authentication signals match. The autonomous vehicle may then confirm again that there is a successful authentication and output the notification.

In another example, a server is in communication with the autonomous vehicle and the mobile computing device of the passenger. The autonomous vehicle may output the first authentication signal and the user may output the second authentication signal. The autonomous vehicle and/or the server may then confirm that the authentication signals match and accordingly output the above notification.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
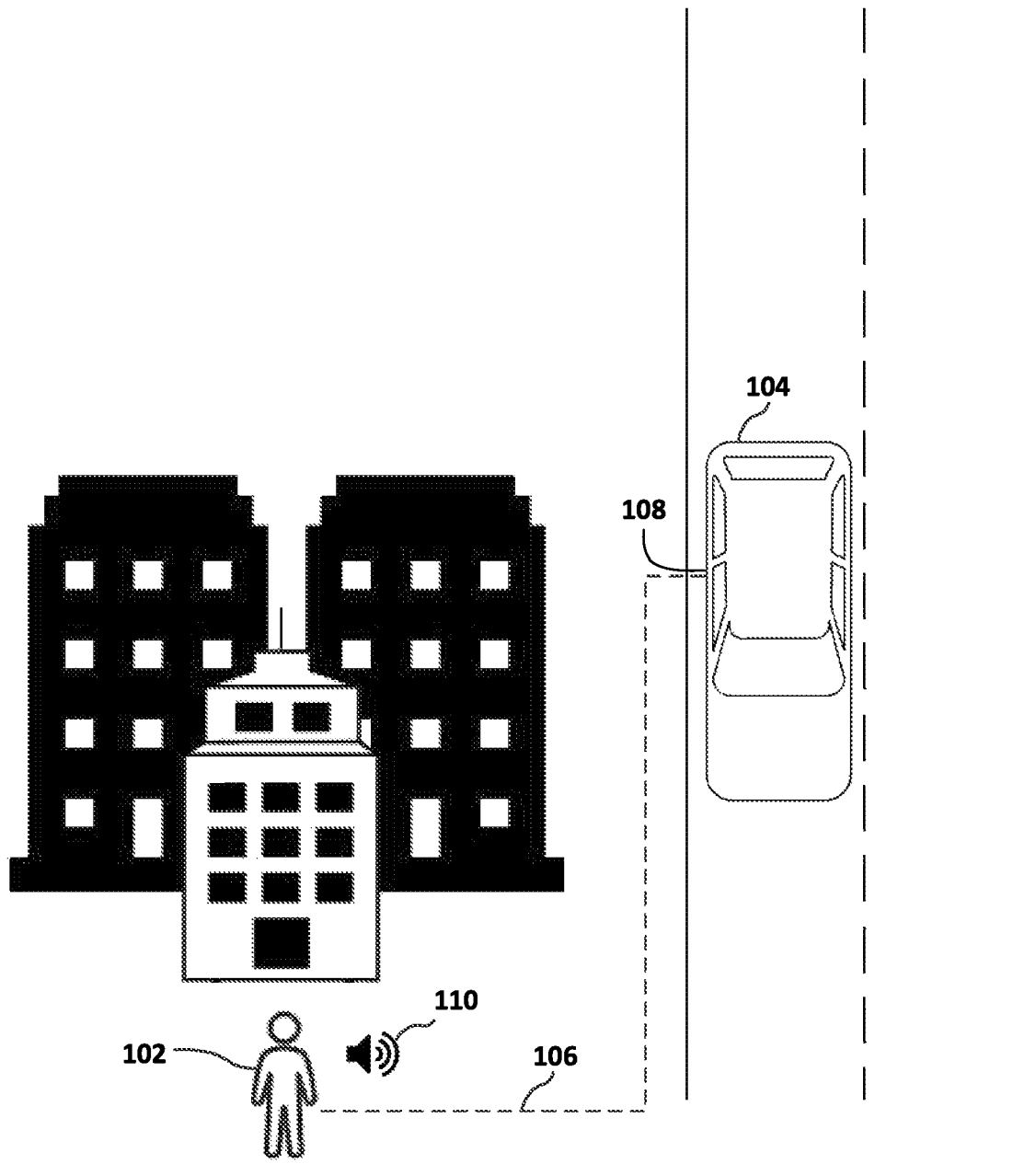
FIG. 1 illustrates an environment having a user and an autonomous vehicle.

Various technologies pertaining to an autonomous vehicle are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Disclosed are various technologies that are particularly well-suited for use when a passenger of an autonomous vehicle has a vision impairment. More specifically, a computer-readable profile of a passenger can indicate that the passenger prefers to receive information audibly. When an event is detected that may be of interest to the passenger, the autonomous vehicle can cause an audible message to be presented to the passenger. Hence, the passenger (who may be visually impaired) need not attempt to request information by interacting with a physical human-machine interface (HMI).

Accordingly, sensed events on a trip in an autonomous vehicle can trigger audible support for a passenger who has a visual impairment. While the techniques set forth herein are described for use with passengers having visual impairments, it is to be appreciated that these techniques can be utilized to assist passengers having other types of disabilities and/or even without disabilities; thus, as noted herein, personalization settings in a profile of a passenger can indicate a preference for audible presentation of information when the passenger is in the autonomous vehicle.

Generally, an autonomous vehicle includes a display screen located in an interior of the autonomous vehicle that can be configured to receive typed-out support requests and provide support information. However, where the passenger is visually-impaired it can be difficult for the passenger to operate the display screen to request support, much less read the support information while the autonomous vehicle is moving. Thus, it may be preferable for the passenger to receive audible support. The disclosed methods and systems can be integrated with an autonomous vehicle to provide contextual audible support messages.

FIGS. 1-4 collectively show a high level overview of different processes that may occur when a user uses an autonomous vehicle.

With reference now to FIG. 1, a user or passenger 102 may request use of an autonomous vehicle 104. The user or passenger 102 may have a vision impairment. Thus, typical use of and navigation to/from the autonomous vehicle 104 may be more difficult for the user 102. For instance, the user 102 may try to follow a path 106 to a pickup location 108 to board the autonomous vehicle 104. However, due to the vision impairment, the user 102 may have difficulty navigating to the autonomous vehicle 104. Thus, audible guidance 110 may be provided to the user to follow the path 106 to the pickup location 108.

As the user 102 approaches the autonomous vehicle 104, the user 102 will need to identify and authenticate the autonomous vehicle 104 to determine that the particular autonomous vehicle 104 is the intended autonomous vehicle to board. Due to the vision impairment the user 102 may have difficulty with identifying the particular autonomous vehicle 104 by traditional authentication methods, such as examining the license plate or make, model and/or color of the vehicle. Thus, the user may audibly authenticate the autonomous vehicle 104.

Figure 2B:
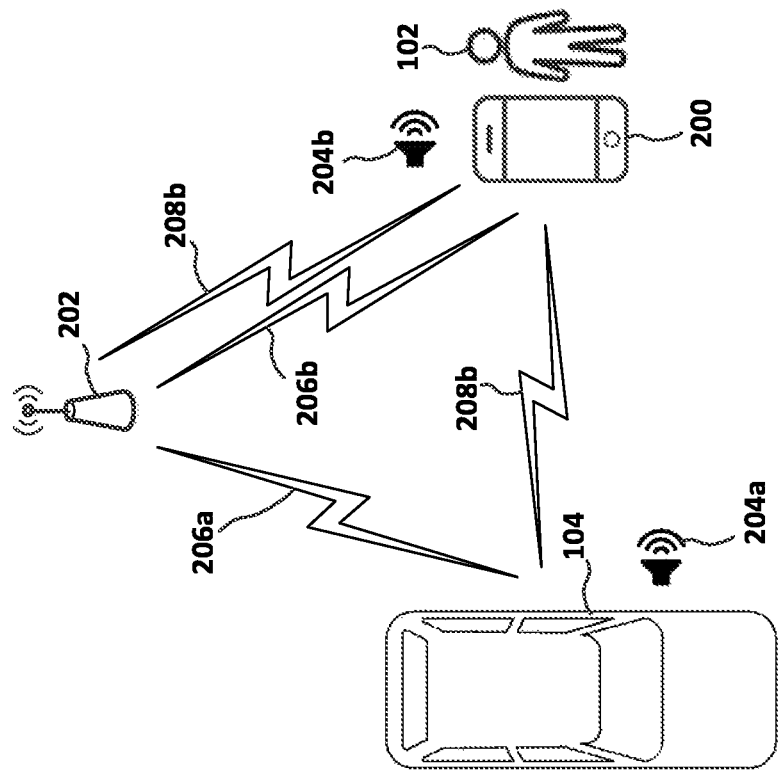
FIG. 2B illustrates another exemplary method of audible authentication between a user and an autonomous vehicle.
Figure 2A:
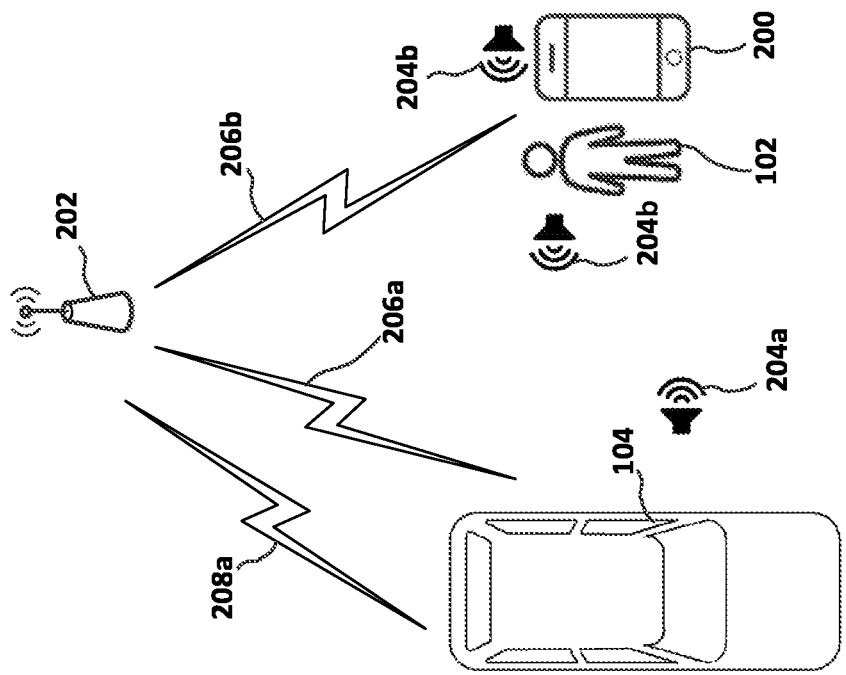
FIG. 2A illustrates an exemplary method of audible authentication between a user and an autonomous vehicle.

FIGS. 2A-2B show two different embodiments for audibly authenticating the autonomous vehicle 104.

FIG. 2A demonstrates a server 202 sending a first audible authentication code or signal 204a over a first signal 206a to the autonomous vehicle 104 and a second audible authentication code or signal 204b over a second signal 206b to a mobile computing device 200 of the user 102. The mobile computing device 200 of the user 102 may output the second audible authentication code 204b so that the user 102 is audibly aware of and/or may audibly receive the second audible authentication signal 204b. The autonomous vehicle 104 then outputs the first audible authentication code 204a so that the user 102 can audibly receive the first audible authentication code 204a. The user 102 may then output the second audible authentication code 204b so that the autonomous vehicle 104 can audibly receive the second audible authentication code 204b. The autonomous vehicle 104 can determine whether the audible authentication codes 204a, 204b match to form a successful authentication and accordingly unlock the autonomous vehicle. The autonomous vehicle 104 may also then notify the server 202 of the successful authentication over a third signal 208a. Alternatively, the server 202 may receive and confirm that the audible authentication codes 204a, 204b match and accordingly unlock the autonomous vehicle 104 over the third signal 208a. Similarly, the mobile computing device 200 of the user 102 may be configured to output the second audible authentication code 204b so that the autonomous vehicle 104 may receive the second audible authentication code 204b, thus relieving the user 102 from receiving and outputting the second audible authentication code 204b.

FIG. 2B demonstrates the server 202 sending the first audible authentication code 204a over the first signal 206a to the autonomous vehicle 104 and the second audible authentication code 204b over the second signal 206b to the mobile computing device 200 of the user 102. The mobile computing device 200 of the user 102 may output the second audible authentication code 204b so that the user 102 is audibly aware of and/or may audibly receive the second audible authentication signal 204b. The autonomous vehicle 104 then outputs the first audible authentication code 204a so that the user 102 can audibly receive the first audible authentication code 204a. The user 102 then verifies the first audible authentication code 204a against the second audible authentication code 204b and notifies the server 202 and/or the autonomous vehicle 104 over the third signal 208b that the audible authentication codes 204a, 204b match. The server 202 may then notify the autonomous vehicle 104, so that the autonomous vehicle 104 would then allow entry thereto.

According to some embodiments, the authentication codes may be communicated in other ways as well (e.g., non-audible means). For example, in some embodiments, the server 202 may securely send authentication codes to the autonomous vehicle 104 and mobile computing device 200 of the user 102. The mobile computing device 200 may be in communication with the autonomous vehicle 104 through an interface, such as Bluetooth. Once the mobile computing device 200 is authenticated, connected to and/or in communication with the autonomous vehicle 104, then the mobile computing device 200 and the autonomous vehicle 104 communicate to ensure that the user 102 is near the autonomous vehicle 104. When the user 102 is near the autonomous vehicle 104, the mobile computing device 200 may signal to the autonomous vehicle 104 to open the doors. In other words, the authentication codes are communicated among the autonomous vehicle 104, the mobile computing device 200, and the server 202 non-audibly. More specifically, the authentication codes are sent from the server 202 to the autonomous vehicle 104 and the mobile computing device 200. Then, the autonomous vehicle 104 and the mobile computing device 200 communicate directly, so that the autonomous vehicle 104 and/or the mobile computing device 200 may authenticate the authentication codes non-audibly. The autonomous vehicle 104 and/or the mobile computing device 200 may then notify the other and/or the server 202, which may then send notification of the successful authentication to one or both of the autonomous vehicle 104 and the mobile computing device 200. In some embodiments, the autonomous vehicle 104 and the mobile computing device 200 may communicate directly, so that the autonomous vehicle 104 and/or the mobile computing device 200 may receive the other authentication code to send both authentication codes back to the server 202 for verification. The server 202 would then notify the autonomous vehicle 104 and/or the mobile computing device 200 of the authentication.

In some scenarios, an unintended third party may also enter the autonomous vehicle 104 while the door is open. This may occur when the unintended third party enters before the user 102, after the user 102, and/or enters through a different door than the user 102. Thus, in some embodiments, the autonomous vehicle 104 may also track and verify a number of people boarding the autonomous vehicle 104 against an intended number of users 102.

In some embodiments, the autonomous vehicle 104 may also verify that the doors to the autonomous vehicle 104 are properly closed. If the doors are not properly closed, the autonomous vehicle 104 may warn and/or notify the user 102. For example, a user may have a long skirt, which gets stuck in the door when the door closes. In some embodiments, the autonomous vehicle 104 may detect this and alert the user 102.

In some embodiments, the autonomous vehicle 104 may detect that the user 102 is accompanied by young children. Thus, the autonomous vehicle 104 may alert the user 102 to lock the doors near where the young children are sitting, so that the young children don't accidentally open the doors. Moreover, the autonomous vehicle 104 may also detect that the young children are wearing seatbelts, such that if the autonomous vehicle 104 fails to detect the seatbelts being fastened, the autonomous vehicle 104 may alert the user 102.

Similarly, in some embodiments, the user 102 may also give commands regarding these and other issues, while in the autonomous vehicle 104 or through their mobile computing device 200, so that the autonomous vehicle 104 may initiate the above.

Figure 3:
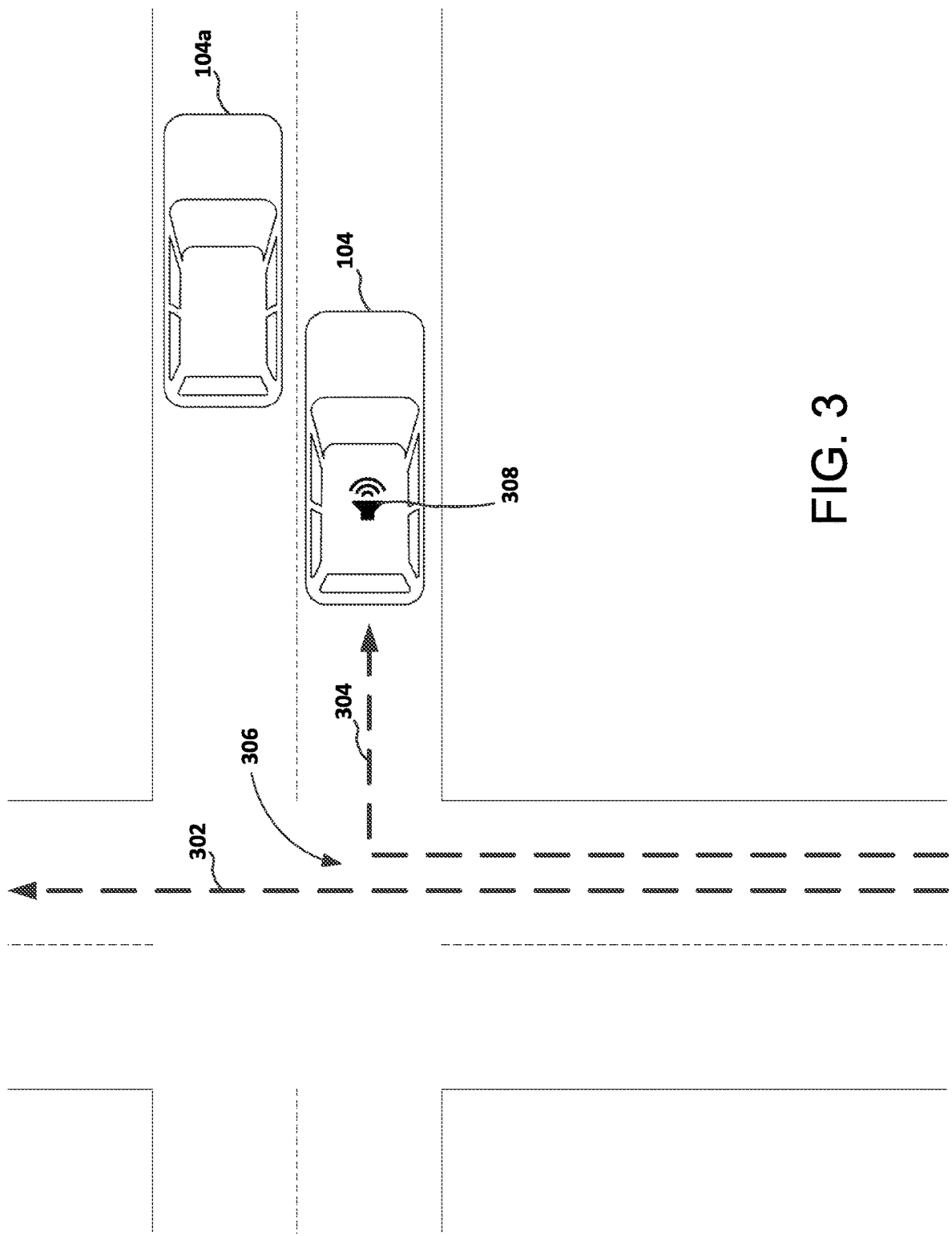
FIG. 3 illustrates an autonomous vehicle during a journey.

FIG. 3 demonstrates that throughout the journey, the autonomous vehicle 104 will have an actual journey route or path 304 that may have a divergence 306 from a predetermined journey route or path 302. Thus, after the user 102 boards the autonomous vehicle 104 and begins a journey to a destination, the user 102 may be curious of the predetermined journey route or path 302 that the autonomous vehicle 104 should follow.

In some cases, the user 102 may also be curious of the reason for the divergence 306 from the predetermined journey route 302. Similarly, it is important to know whether the divergence 306 from the predetermined journey route 302 is the result of a malicious attack from a third party. Thus, as will be discussed in further detail below, a support message 308 may be output so that the user 102 may be aware of the divergence 306 and the cause of the divergence 306. The support message 308 may be output audibly, haptically, visibly, and/or a variety of other methods. Similarly, the autonomous vehicle 104 may provide the support message 308 for some and/or all maneuvers that the autonomous vehicle 104 takes. For example, "we are making a left turn at Bush street, there is a doubled parked vehicle in front of us. I will wait for a safe opportunity and pass." Thus, the support message 308 may additionally be used to let the user 102 know that there is not a divergence 306.

Figure 4:
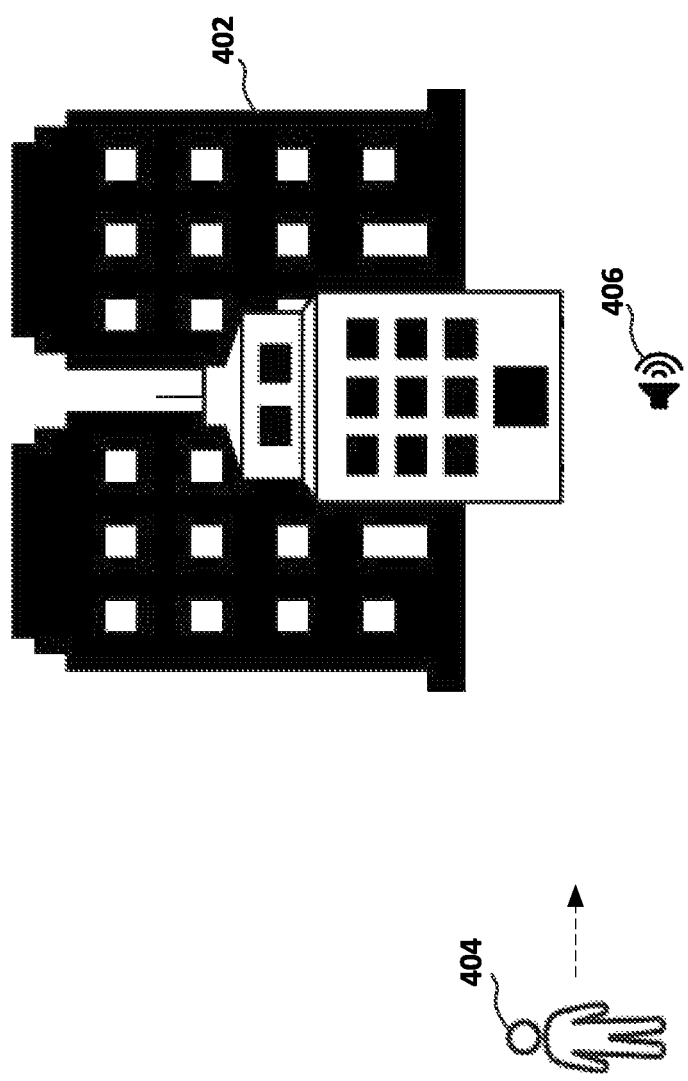
FIG. 4 illustrates a user and an autonomous vehicle arriving at a destination.

FIG. 4 demonstrates the autonomous vehicle 104 arriving at a destination 402. In the absence of the divergence 306, the destination 402 will be the intended destination as the user 102 requested. As the user 102 prepares to disembark, the autonomous vehicle 104 may implement procedures to ensure that the user 102 disembarks safely. For users 102 with vision impairments, disembarking safely may be difficult due to a lesser ability to see potential hazards or dangers outside of the autonomous vehicle 104. For example, a pedestrian 404 may be walking down the street towards the autonomous vehicle 104. Furthermore, the user 102 may be unaware of which side of the autonomous vehicle 104 he/she should disembark on. For example, in a typically unusual situation, the autonomous vehicle 104 may pull over on the left side of a one-way street. Thus, the autonomous vehicle 104 may provide an audible message 406 on from a side that the user 102 should disembark on. In some embodiments, the audible message 406 may provide directions relative to the user 102. For example, the audible message 406 may state "Please exit to your right." In some scenarios, there may be multiple users 102 in the autonomous vehicle 104. Thus, the autonomous vehicle 104 may identify each user 102 and localize the audible message 406, such that the audible message 406 is sent to the specific user 102. In some embodiments, the autonomous vehicle 104 may instead output the audible message 406 having more generic instructions so that each user 102 is notified of which side to exit from.

Similarly, the autonomous vehicle 104 may output the audible message 406 to an exterior of the autonomous vehicle 104. The audible message 406 may indicate that a person (e.g., a person that has a disability) is disembarking from the autonomous vehicle 104 to notify and protect potential pedestrians 404. Although described as audible, the audible message 406 may be communicated in a variety of other methods, such as haptically, visibly, etc.

Although various embodiments disclosed here relate to helping persons that have disabilities, this and/or other embodiments may be used to assist any user 102. In other words, many of these improvements are still helpful to people irrespective of disabilities.

Figure 5:
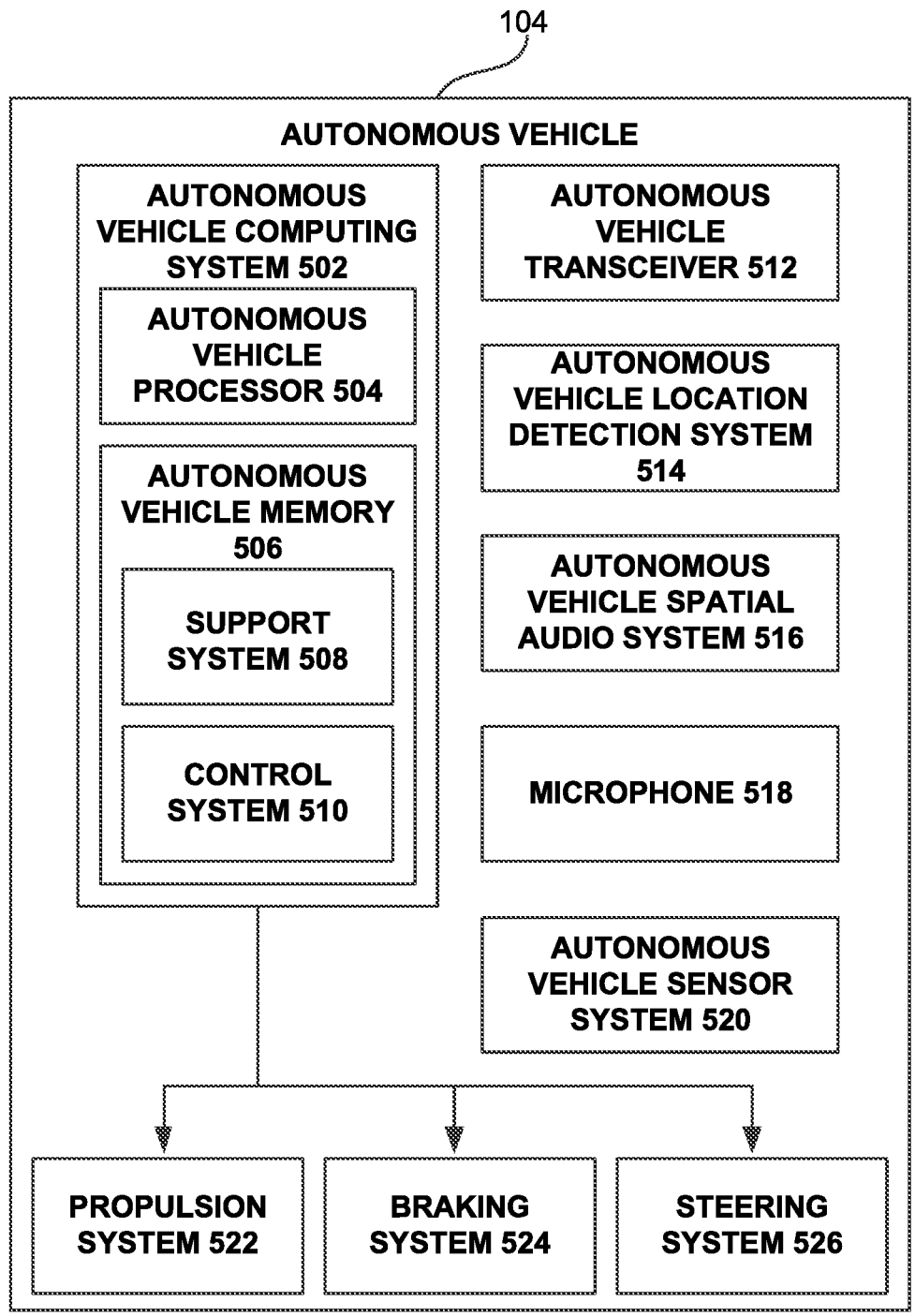
FIG. 5 illustrates an autonomous vehicle in accordance with this subject disclosure.

FIG. 5 is a schematic block diagram of the autonomous vehicle 104. The autonomous vehicle 104 may have an autonomous vehicle computing system 502, an autonomous vehicle transceiver 512, an autonomous vehicle location detection system 514, an autonomous vehicle audio system 516, a microphone 518, and an autonomous vehicle sensor system 520.

The autonomous vehicle computing system 502 may have an autonomous vehicle processor 504 and autonomous vehicle memory 506, where the autonomous vehicle memory 506 stores computer-executable instructions that are executed by the autonomous vehicle processor 504. As an example, the autonomous vehicle processor 504 may be or may include a central processing unit (CPU), a graphics processing unit (GPU), a plurality of GPUs and/or CPUs, an application-specific integrated circuit (ASIC), or the like.

Within the autonomous vehicle memory 506 may be a support system 508 and control system 510. The support system 508 is configured to receive and/or store preference data for the user 102 in a computer-readable profile of the user. The preference data may include or show that: 1) the user is differently abled (e.g. visual impairment); 2) information should be delivered in a certain way (e.g. audibly); and 3) the frequency of update information (i.e. how often the autonomous vehicle 104 should tell the user 102 of turns, stoplights, etc.). For example, the user 102 may have a visual impairment, so the user 102 would define in his profile that he would like information to be delivered audibly at every turn.

Furthermore, the support system 508 may be configured to continually track the movement of the autonomous vehicle 104 and provide updates of the movements of the autonomous vehicle 104 to the user 102. For example, the autonomous vehicle 104 may audibly notify the visually impaired user 102 that the autonomous vehicle 104 is making a turn along the predetermined journey route 302 or is making a turn, resulting in the divergence 306 from the predetermined journey route 302.

The autonomous vehicle memory 506 also stores computer-executable instructions that run the control system 510. The control system 510 is configured to control a propulsion system 522, a braking system 524, and a steering system 526 of the autonomous vehicle 104. Similarly, the control system 510 may also control other systems in the autonomous vehicle, such as locks on doors of the autonomous vehicle 104.

The autonomous vehicle 104 further has an autonomous vehicle transceiver 512 that is configured to communicate with other systems. For example, the autonomous vehicle transceiver 512 may send to and/or receive signals from a mobile device of the user and/or with the server 202.

Onboard the autonomous vehicle 104 may also be an autonomous vehicle location detection system or position sensor system 514. This may be any sensor that provides detection of the location of the autonomous vehicle 104, such as a global positioning system (GPS) or a combination of other systems.

The autonomous vehicle 104 may further have an audio system 516 that may output information and other audible signals, such as music. The audio system 516 may also be a spatial audio system that provides audible signals from a variety of different directions, such that the user 102 can understand directional cues from the audio system 516. For example, the audio system 516 may audibly provide directions from a first side of the autonomous vehicle 104 to exit the autonomous vehicle 104 from the first side.

Similarly, the autonomous vehicle 104 may have a microphone 518 and/or autonomous vehicle sensor system 520 to receive audible and other types of signals. For example, the microphone 518 may receive the aforementioned second audible authentication code 204b from the user. The autonomous vehicle sensor system 520 may be composed of a variety of different observational sensors, such as light detection and ranging (LIDAR) sensors, cameras, suspension monitors etc. These various sensors may provide a wide variety of signals that indicate different types of movement of the autonomous vehicle 104 as well as information about the environment around the autonomous vehicle 104. For example, the suspension monitors may detect a turn based on different loads on each wheel. As another example, cameras and LIDAR are able to determine whether obstacles may be near a door of the autonomous vehicle 104 or whether other hazards are near or in the surroundings of the autonomous vehicle 104.

Figure 6:
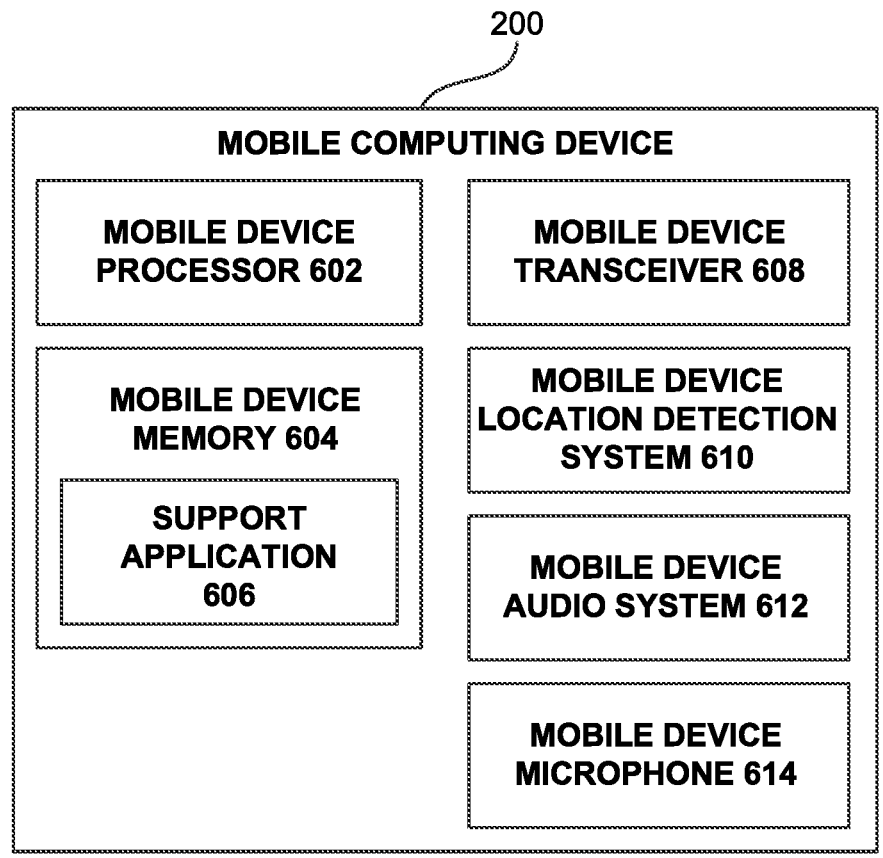
FIG. 6 illustrates a mobile computing device in accordance with this subject disclosure.

FIG. 6 illustrates a mobile computing device 200 that the user 102 may have. The mobile computing device 200 may take form in a wide variety of different embodiments, including, but not limited to smart phones, smart watches, tablets, hearing aids, etc. The mobile computing device 200 may have a mobile device processor 602, mobile device memory 604, a mobile device transceiver 608, a mobile device location detection system 610, a mobile device audio system 612, and a mobile device microphone 614.

The mobile device processor 602 may be or may include a central processing unit (CPU), a graphics processing unit (GPU), a plurality of GPUs and/or CPUs, an application-specific integrated circuit (ASIC), or the like.

The mobile device memory 604 stores computer-executable instructions that are executed by the mobile device processor 602. A support application 606 may be stored within the mobile device memory 604. The support application 606 may be configured to interface with the user 102 to receive and/or store the preference data for the user 102 in a computer-readable profile of the user. The preference data may include or show that: 1) the user is differently abled (e.g. visual impairment); 2) information should be delivered in a certain way (e.g. audibly); and 3) the type of information to be given (i.e. guidance to and from the autonomous vehicle 104). For example, the user 102 may have a visual impairment, so the user 102 would define in his profile that he would like guidance to and from the autonomous vehicle 104 to be delivered audibly.

The mobile computing device 200 may have a mobile device transceiver 608 configured to communicate with other systems. For example, the mobile device transceiver 608 may send to and/or receive signals from the autonomous vehicle 104 and/or with the server 202.

The mobile computing device 200 may also have a mobile device location detection system 610. This may be any sensor that provides a location signal of the autonomous vehicle, such as a global positioning system (GPS) or a combination of other systems.

The mobile device audio system 612 of the mobile computing device 200 is adapted to output audible signals, such as audible notifications, music, audible guidance, etc. The mobile device audio system 612 may be a speaker, speakers, a headset, and/or other similar component or devices that provide audible signals. The mobile device audio system 612 may be a component within the mobile computing device 200 or may also be an attachment or peripheral that connects to the mobile computing device 200.

The mobile computing device 200 may also have a mobile device microphone 614. The mobile device microphone 614 is adapted to receive audible signals, such as the first audible authentication code 204a from the autonomous vehicle.

Figure 7:
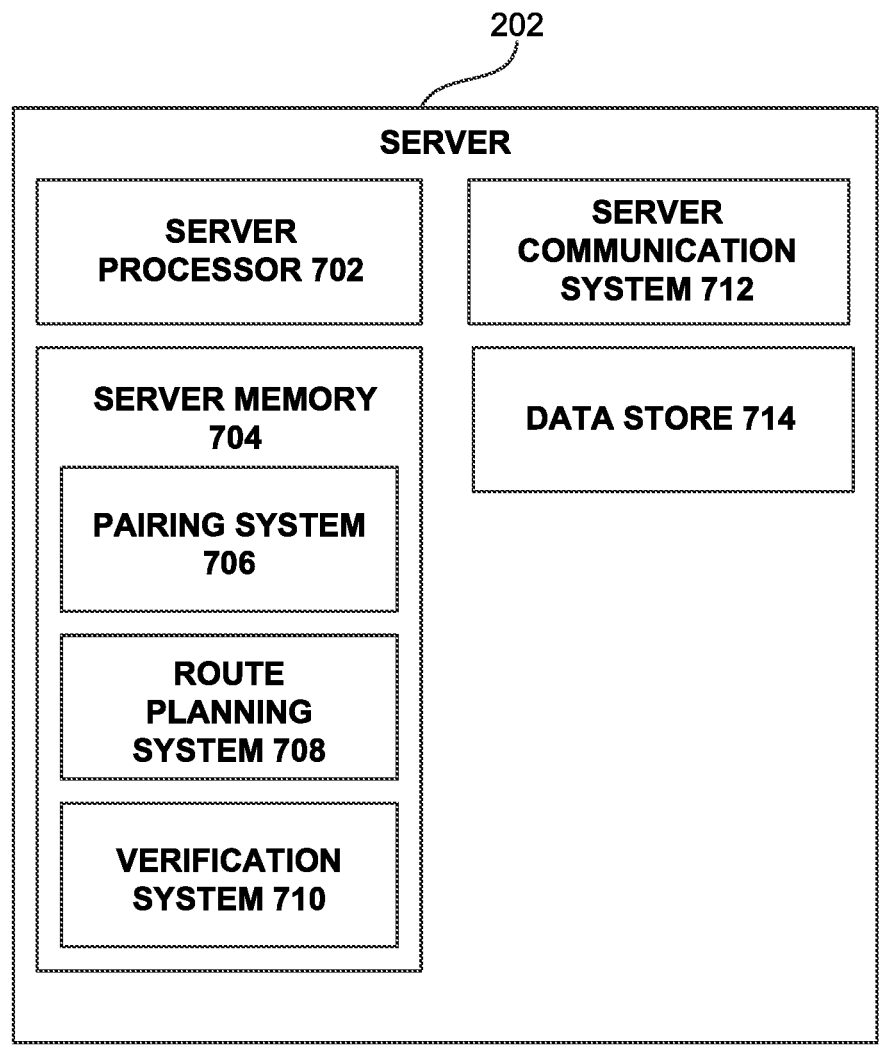
FIG. 7 illustrates a server in accordance with this subject disclosure.

FIG. 7 illustrates the server 202 that may communicate with the autonomous vehicle 104 and the mobile computing device 200. The server 202 may have a server processor 702, server memory 704, a server communication system 712, and a data store 714.

The server processor 702 may be or may include a central processing unit (CPU), a graphics processing unit (GPU), a plurality of GPUs and/or CPUs, an application-specific integrated circuit ASIC), or the like.

The server memory 704 stores computer-executable instructions that are executed by the server processor 702. Within the server memory 704 may be a pairing system 706, a route planning system 708, and a verification system 710.

The pairing system 706 is configured to connect the user 102 with the autonomous vehicle 104. The connection may include both the designation or "pairing" of the user 102 with the specific autonomous vehicle 104 and/or the authentication process detailed further below between the user 102 and the specific autonomous vehicle 104.

The route planning system 708 is configured to determine the predetermined journey route 302 based on a location of the user 102 at the time of the user's request for ridesharing service and a location of the destination 402 requested. The route planning system 708 may take into account a wide variety of factors to determine the predetermined journey route 302, such as traffic, weather conditions, etc. The route planning system 708 may also be configured to determine the path 106 to assist the user 102 in finding the autonomous vehicle 104, as shown in FIG. 1. Similarly, the route planning system 708 may also be configured to determine a final path from a drop-off location to the destination 402, as shown in FIG. 4.

The verification system 710 is configured to track a location of the user 102 through the mobile device location detection system 610 of the user's mobile computing device 200 and a location of the autonomous vehicle 104 through the autonomous vehicle location detection system 514. As the location of the user 102 changes, the verification system 710 tracks the changes in real-time to form and update the actual journey route 304. In addition, the verification system 710 is configured to compare the location of the user 102 and the actual journey route 304 against the predetermined journey route 302 for potential divergences 306.

The server communication system 712 configured to communicate with the autonomous vehicle 104 and/or the mobile computing device 200. The server communication system 712 may also be configured to communicate with additional autonomous vehicles 104a and other mobile computing devices 200.

The server 202 may also have a data store 714, in which data for various systems may be stored. For example, the data store 714 may store profiles of users 102 and preference data for each user 102. Furthermore, data from autonomous vehicle sensor systems 520 may be sent the data store 714 to be stored.

Figure 8:
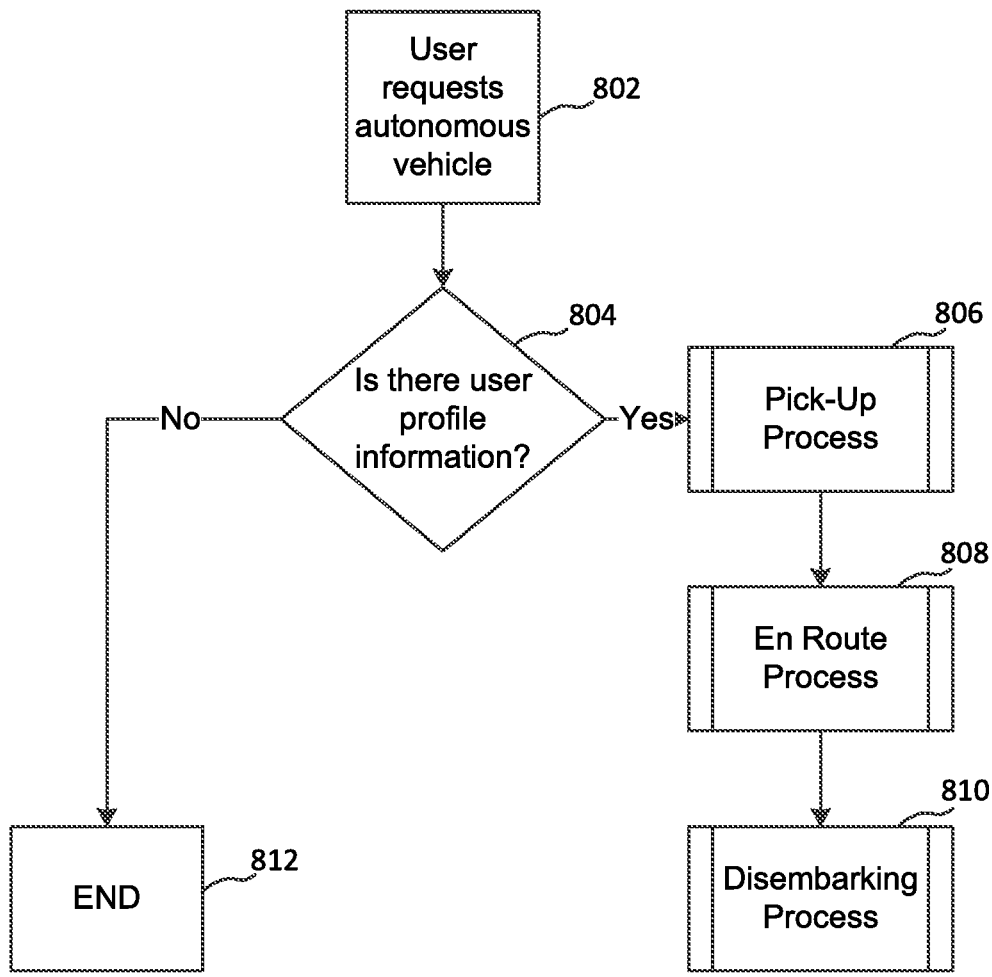
FIG. 8 is a flow diagram that illustrates various processes that occur when a user requests a ridesharing service.

FIG. 8 is a flowchart diagram that provides an overview of a process the user 102 may encounter when requesting and using a ridesharing service. Subprocesses within the process of requesting and using a ridesharing service may consist of a pick-up process 806, an en route process 808, and a disembarking process 810. The process ends at step 812 if the user 102 does not need the ridesharing service or does not indicate the need and/or preferences for audible support.

Part 1: Pick-Up

As mentioned above, FIG. 8 is a flowchart diagram that provides an overview of a process the user 102 may encounter when requesting and using a ridesharing service. At step 802, in various embodiments, the user 102 requests the autonomous vehicle 104. At some earlier point in time, the user 102 may have set up a user profile, having preference and/or disability data therein. Thus, step 804 shows that upon receiving the request, the server 202 may access the user profile and determine whether the user is differently abled, requires special actions, and/or prefers special actions, such as providing information audibly.

Figure 9A:
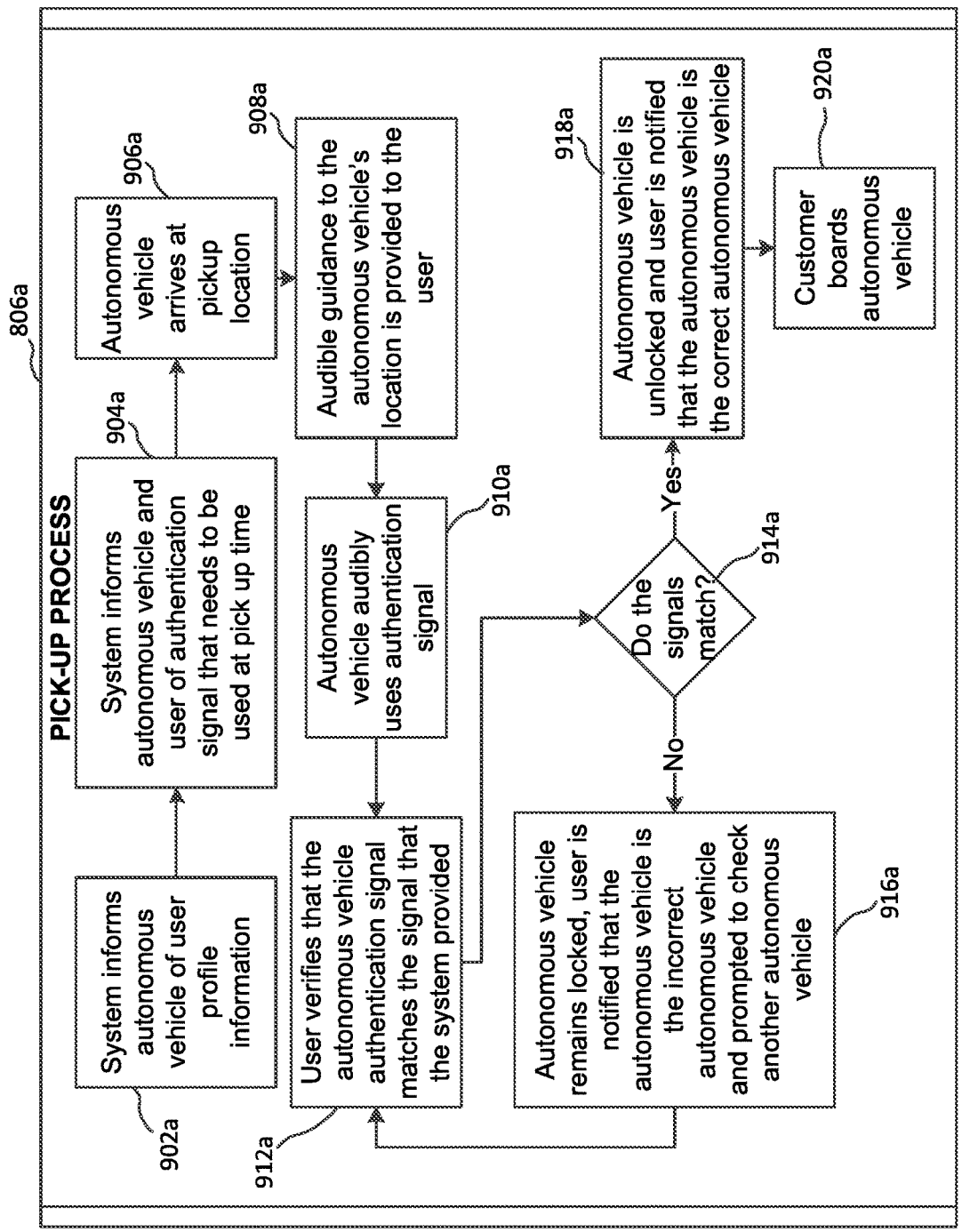
FIG. 9A is a flow diagram that illustrates a pickup process in FIG. 8.
Figure 9B:
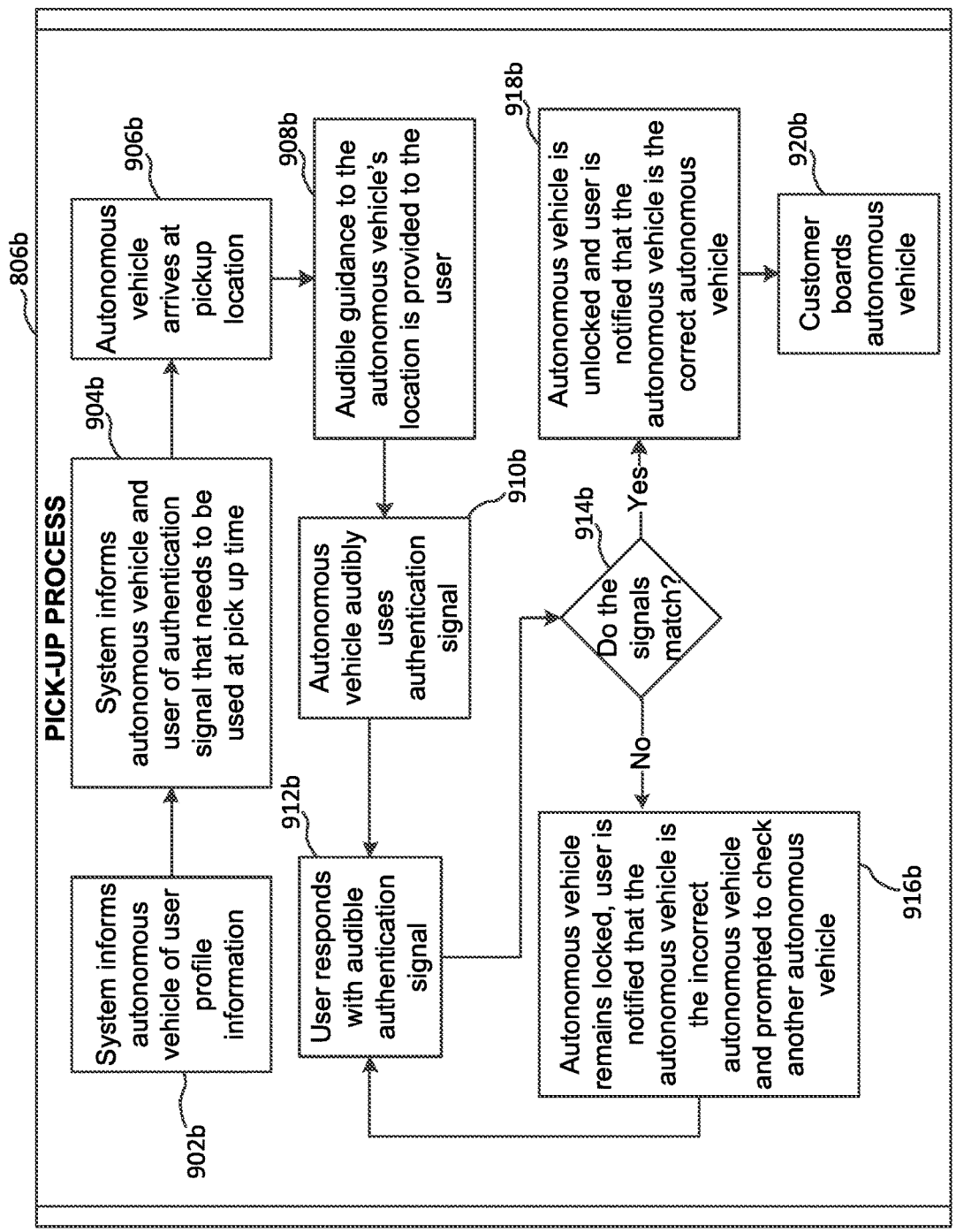
FIG. 9b is a flow diagram that illustrates a second safe boarding process.

FIGS. 9A and 9B each illustrate an exemplary pick-up process 806a, 806b, respectively, that may be used for the pick-up process 806.

FIG. 9A illustrates what occurs after the user 102 requests use of the autonomous vehicle 104. As shown in step 902a, the server 202 and/or the mobile computing device 200 notifies the autonomous vehicle 104 of user profile information, which may include user preferences, special actions, special actions and/or the user's 102 disabilities. Next step 904a shows the server 202 sends the first audible authentication code 204a to the autonomous vehicle 104 over the first signal 206a and the second audible authentication code 204b to the user 102 over the second signal 206b. Although shown as occurring at different points in time, steps 902a and 904a may occur in any combination of points in time. For example, the two steps 902a, 904a may occur concurrently, or step 904a may occur before step 902a. Similarly, the server 202 may send the audible authentication codes 204a, 204b in any order to either party. For example, the first audible authentication code 204a may be sent to the user 102 after the second audible authentication code 204b is sent to the autonomous vehicle 104.

In step 906a, when the autonomous vehicle 104 arrives at pickup location 108, the autonomous vehicle 104 notifies the server 202 and/or the mobile computing device 200 of the user 102 of the arrival of the autonomous vehicle 104. In some instances, the autonomous vehicle 104 may be unable to arrive at the exact location of the user 102, which would require the user 102 to travel to the location of the autonomous vehicle 104 for pick-up and/or boarding.

For users 102 with visual impairments, finding the location of the autonomous vehicle 104 may be difficult without assistance. Thus, in step 908a, if the user 102 has noted in a user profile that the user 102 is visually impaired and/or would prefer to receive audible guidance to the pick-up location 108, the server 202 and/or the mobile computing device 200 would provide audible guidance 110 for the path 106 from the user's current position to pick-up location 108, where the autonomous vehicle 104 is situated.

FIGS. 2A and 9A show in step 910a, when the mobile device location detection system 610 outputs a position signal similar to and/or within a threshold distance from the pick-up location 108, the autonomous vehicle 104 audibly outputs the first audible authentication signal 204a. At step 912a and 914a, the user 102 then hears the first audible authentication signal 204a and verifies the first audible authentication signal 204a against the second audible authentication signal 204b that the server 202 sent to the user's mobile computing device 200 in step 904a. In some embodiments, the mobile computing device 200 may output the second audible signal 204b again so that the user 102 may correctly verify the audible authentication codes 204a,

204*b*. The user 102 may then notify the server 202 whether the audible authentication codes 204*a*, 204*b* match. In some embodiments, the user 102 may select an option on the mobile computing device 200 indicating whether the audible authentication codes 204*a*, 204*b* match. If the user 102 verifies that the audible authentication codes 204*a*, 204*b* match, then the process continues forward to step 918*a*.

Step 916*a* shows that if the audible authentication codes 204*a*, 204*b* do not match, the autonomous vehicle 104*a* is not the autonomous vehicle 104 that the user 102 is searching for. Thus, the user 102 does not board the autonomous vehicle 104*a* and is prompted to search nearby for the intended autonomous vehicle 104. More specifically, the server 202 receives notice that the audible authentication codes 204*a*, 204*b* do not match. Thus, the server 202 sends instructions to the autonomous vehicle 104 and/or the mobile computing device 200 to notify the user that the autonomous vehicle 104 is not the intended autonomous vehicle 104 and to search nearby for the intended autonomous vehicle 104. In some embodiments, the mobile computing device 200 may communicate directly with the autonomous vehicle 104 that the autonomous vehicle 104 is not the intended autonomous vehicle 104. In some embodiments, to notify the user 102 that the autonomous vehicle 104 is not the intended autonomous vehicle 104, the autonomous vehicle 104 may issue a signal, such as a honk, to indicate that the autonomous vehicle 104 is incorrect. In some embodiments, the intended autonomous vehicle 104 may issue a signal, such as a honk, to provide the user 102 notice of where the autonomous vehicle 104 is located. Again, audible guidance 110 may be provided to the user 102. In some embodiments, the mobile computing device 200 of the user 102 could notify the user 102 in some way that is consistent with the user's understanding that there is a mismatch with the autonomous vehicle 104. The mismatch may also be verified by the server 202 and sent to the mobile computing device 200. For example, the mobile computing device 200 may also send, in combination with whether the audible authentication codes 204*a*, 204*b* match, the audible authentication codes 204*a*, 204*b* received to the server 202. The server 202 may check and/or verify whether the audible authentication codes 204*a*, 204*b* match. In some embodiments, the mobile computing device 200 may be a smart braille device, such that the smart braille device can communicate to the user 102 the match or mismatch with the autonomous vehicle 104.

Matching of the audible authentication codes 204*a*, 204*b* may have a variety of different implementations. For example, a sequence of random or specific letters, words, and/or numbers may be used (e.g. a license plate of the autonomous vehicle 104, 1234, 1493, ABC, ASDF, etc.). For example, in some embodiments, the server 202 may send the user 102 the license plate number as one of the authentication codes, such that if the user gets the same license plate number as one of the authentication codes from the autonomous vehicle 104, then the autonomous vehicle 104 and the user 102 are matched. As another example, a melody of a song may also be used. Similarly, a successful authentication need not be exact copies of the audible authentication codes 204*a*, 204*b* (e.g., the first audible authentication code 204*a* may be 1234, while the second audible authentication code 204*b* may be 5678). As another example, a first part of a melody of a song may be used as the first audible authentication code 204*a* and a second part of the melody of the song may be used as the second audible authentication code 204*b*. In other words, a "matching" may be a relational connection between the first audible authentication code 204*a* and the second audible authentication code 204*b* instead of a mirror image or identical copy of the other. Thus, matching of the audible authentication codes 204*a*, 204*b* to form the successful authentication may be implemented in a variety of different ways.

At step 918*a*, when the user 102 verifies that the audible authentication codes 204*a*, 204*b* match, the user 102 is allowed to board the autonomous vehicle 104. More specifically, in response to receiving notice that the audible authentication codes 204*a*, 204*b* match, the server 202 sends instructions to the autonomous vehicle 104 and/or the mobile computing device 200 to notify the user 102 that the autonomous vehicle 104 is the intended autonomous vehicle. In some embodiments, the mobile computing device 200 of the user 102 may communicate securely with the autonomous vehicle 104 either directly and/or through the server 202. Furthermore, when the user 102 is allowed to board the autonomous vehicle 104, the autonomous vehicle 104 may notify the user 102. In some embodiments, the autonomous vehicle 104 may unlock the doors, play a welcome message, welcome the customer with a personalized message verifying the name of the customer and/or the destination 402 etc. In some embodiments, the autonomous vehicle 104 may recognize that the user 102 has come with additional passengers and welcomes the additional passengers as well. Step 920*a* shows the user 102 boarding the autonomous vehicle 104.

FIG. 9B also illustrates what may occur after the user 102 requests use of the autonomous vehicle 104. More specifically, FIG. 9B shows a similar pick-up process with a different method of authentication. As shown in step 902*b*, the server 202 and/or the mobile computing device 200 notifies the autonomous vehicle 104 of user profile information, which may include user preferences, special actions and/or the user's 102 disabilities. Next step 904*b* shows the server 202 sends the first audible authentication code 204*a* to the autonomous vehicle 104 over the first signal 206*a* and the second audible authentication code 204*b* to the user 102 over the second signal 206*b*. Although shown as occurring at different points in time, steps 902*b* and 904*b* may occur in any combination of points in time. For example, the two steps 902*b*, 904*b* may occur concurrently, or step 904*b* may occur before step 902*b*. Similarly, the server 202 may send the audible authentication codes 204*a*, 204*b* in any order to either party. For example, the first audible authentication code 204*a* may be sent to the user 102 after the second audible authentication code 204*b* is sent to the autonomous vehicle 104.

In step 906*b*, when the autonomous vehicle 104 arrives at pickup location 108, the autonomous vehicle 104 notifies the server 202 and/or the mobile computing device 200 of the user 102 of the arrival of the autonomous vehicle 104. In some instances, the autonomous vehicle 104 may be unable to arrive at the exact location of the user 102, which would require the user 102 to travel to the location of the autonomous vehicle 104 for pick-up and/or boarding.

For users 102 with visual impairments, finding the location of the autonomous vehicle 104 may be difficult without assistance. Thus, in step 908*b*, if the user 102 has noted in a user profile that the user 102 is visually impaired and/or would prefer to receive audible guidance to the pick-up location 108, the server 202 and/or the mobile computing device 200 would provide audible guidance 110 for the path 106 from the user's current position to pick-up location 108, where the autonomous vehicle 104 is situated.

FIGS. 2B and 9B show in step 910*b*, when the mobile device location detection system 610 outputs a position signal similar to and/or within a threshold distance from the pick-up location 108, the autonomous vehicle 104 audibly outputs the first audible authentication signal 204*a*.

At step 912*b*, after the autonomous vehicle 104 outputs the first audible authentication code 204*a*, the user 102 is prompted to respond with the second audible authentication code 204*b*.

Next, at step 914*b*, the microphone 518 may then receive the audibly output second audible authentication code 204*b* and either process the matching authentication onboard the autonomous vehicle 104 or send the audible authentication signals 204*a*, 204*b* from the autonomous vehicle transceiver 512 to the server communication system 712, where the server 202 uses the pairing system 706 to process and identify whether the audible authentication signals 204*a*, 204*b* match. If the latter, the server communication system 712 then notifies the autonomous vehicle 104 whether the audible authentication signals 204*a*, 204*b* match.

Step 916*b* shows that if the audible authentication codes 204*a*, 204*b* do not match, the autonomous vehicle 104*a* is not the autonomous vehicle 104 that the user 102 is searching for. Thus, the user 102 does not board the autonomous vehicle 104*a* and is prompted to search nearby for the intended autonomous vehicle 104. For example, the autonomous vehicle 104 may issue a signal, such as a honk, to indicate that the autonomous vehicle 104 is incorrect. In some embodiments, the intended autonomous vehicle 104 may issue a signal, such as a honk, to provide the user 102 some notice of where the autonomous vehicle 104 is located. Again, audible guidance 110 may be provided to the user 102. In some embodiments, the mobile computing device 200 of the user 102 could notify the user 102 in some way that is consistent with the user's understanding that there is a mismatch with the autonomous vehicle 104. The mismatch may also be verified by the server 202 and sent to the mobile computing device 200. In some embodiments, the mobile computing device 200 may be a smart braille device, such that the smart braille device can communicate to the user 102 the match or mismatch with the autonomous vehicle 104.

Step 918*b* shows that if the audible authentication signals 204*a*, 204*b* match, then the user 102 is allowed to board the autonomous vehicle 104. In some embodiments, the mobile computing device 200 of the user 102 may communicate securely with the autonomous vehicle 104 either directly and/or through the server 202. Furthermore, when the user 102 is allowed to board the autonomous vehicle 104, the autonomous vehicle 104 may notify the user 102. In some embodiments, the autonomous vehicle 104 may unlock the doors, play a welcome message, welcome the customer with a personalized message verifying the name of the customer and/or the destination 402 etc. In some embodiments, the autonomous vehicle 104 may recognize that the user 102 has come with additional passengers and welcomes the additional passengers as well. Step 920*b* shows the user 102 boarding the autonomous vehicle 104.

It is further contemplated that the audible authentication codes 204*a*, 204*b* need not both be audible. For example, the autonomous vehicle 104 may output the first audible authentication code 204*a* so that the user 102 may authenticate the first audible authentication code 204*a* against a non-audible authentication code (e.g. haptic-based code that matches a pattern of the first audible authentication code, or a visible authentication code for non-visually impaired users, etc.). The mobile computing device 200 would then send the signal to the server 202 informing the server 202 of the successful authentication. The server 202 may then send instructions to the autonomous vehicle 104 to unlock.

Many other variations of authentication are further within the scope of this disclosure. For example, the autonomous vehicle 104 may output the first audible authentication signal 204*a*, while the mobile computing device 200 is configured to and receives the first audible authentication signal 204*a*. The mobile computing device 200 may then encode the first audible authentication signal 204*a* and transmit the first audible authentication signal 204*a* to the server 202, where the server 202 can authenticate and notify both the autonomous vehicle 104 and the mobile computing device 200 if there is a successful authentication. Similarly, the mobile computing device 200 may instead output the first audible authentication signal 204*a*, while the autonomous vehicle 104 is configured to and receives the first audible authentication signal 204*a*. The autonomous vehicle 104 may then encode and transmit the first audible authentication signal 204*a* to the server 202, where the server 202 can authenticate and notify both the autonomous vehicle 104 and the mobile computing device 200 if there is a successful authentication. In these instances, only the first audible authentication code 204*a* is necessary for a successful authentication.

Figure 10:
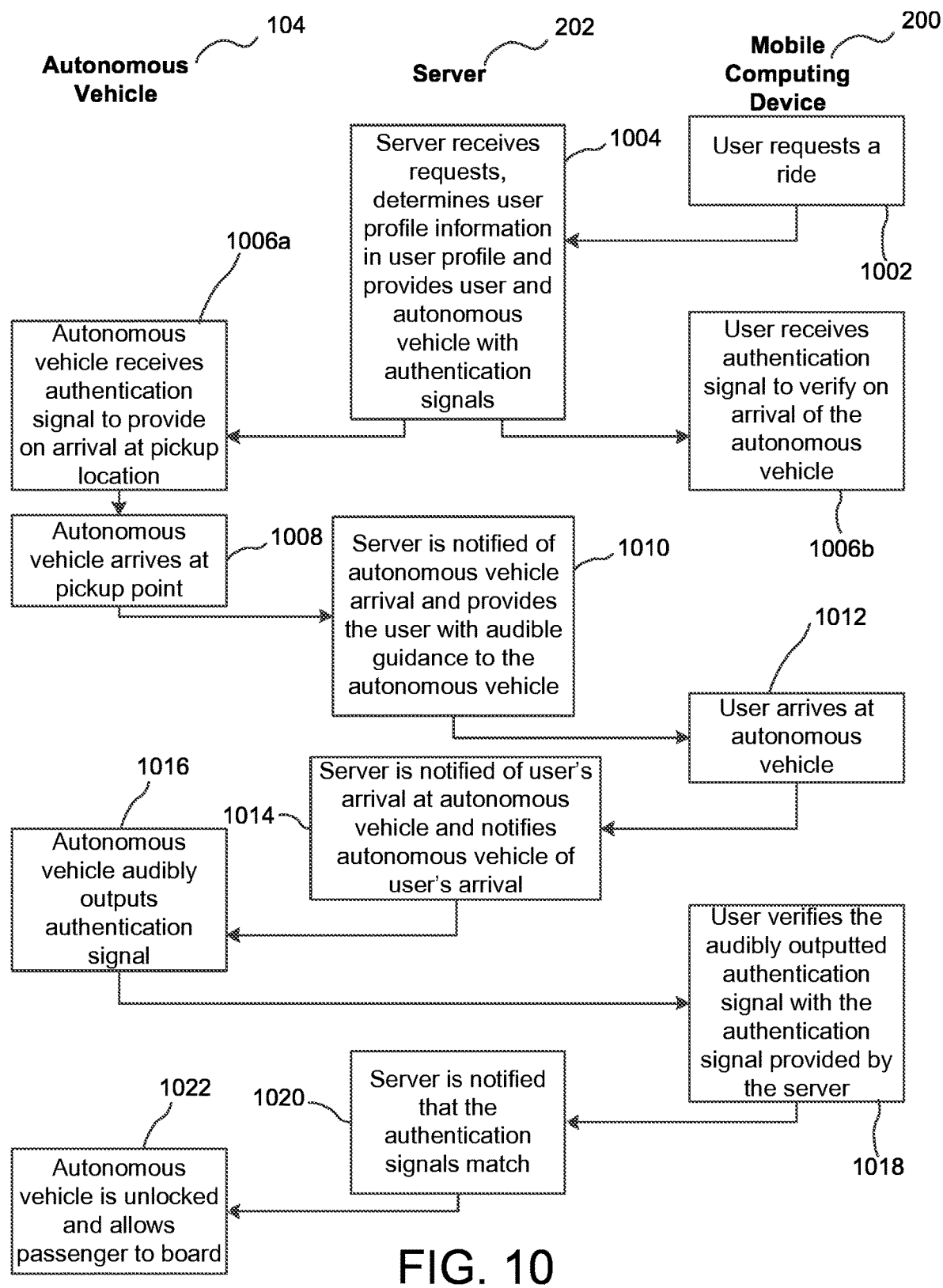
FIG. 10 is a timeline flow diagram that illustrates a successful safe boarding process.

FIG. 10 provides an exemplary timeline of different processes, while also providing insight into which component may handle the process. However, the timeline and categorization of processes by each component is merely provided as an example and it is to be understood that the order and handling of each process by different components may be varied in a wide variety of different ways.

As discussed above, the user 102 may request a ride in step 1002. More specifically, the user 102 may use the support application 606 on his or her mobile computing device 200 to request a ride on the autonomous vehicle 104. The request is sent through the mobile device transceiver 608 to the server communication system 712.

In step 1004, the server 202 then accesses the user profile in the data store 714 to determine user profile information, such as if the user 102 is differently abled and/or if the user 102 has requested that information be provided audibly. The request is then handled by the pairing system 706 to pair the user 102 with the autonomous vehicle 104. The pairing system 706 then creates and sends authentication signals to both autonomous vehicle transceiver 512 and the mobile device transceiver 608 of the mobile computing device 200 of the user 102. If the user 102 is visually impaired or has noted in the profile that information should be provided audibly, then the authentication signals will be the audible authentication signals 204*a*, 204*b*.

In step 1006*a*, the autonomous vehicle 104 receives the first audible authentication signal 204*a*. In step 1006*b*, the user 102 and/or the mobile computing device 200 of the user 102 receives the second audible authentication signal 204*b* to verify when authenticating the autonomous vehicle 104.

Step 1008 shows the autonomous vehicle arriving at the pickup location 108.

Step 1010 shows that, in response to the autonomous vehicle 104 arriving at the pick-up location 108, the server 202 is notified of the arrival of the autonomous vehicle 104 by either a notification sent from the autonomous vehicle 104 to the server communication system 710 and/or a matching of the location signal from the autonomous vehicle location detection system 514 with the pickup location 108. The server 202 then notifies the user 102 of the arrival of the autonomous vehicle 104 and, in accordance with the user's profile, causes the mobile device audio system 612 to output and provide audible guidance 110 to the pickup location 108, where the autonomous vehicle 104 is also located. Alternatively or additionally, the autonomous vehicle 104 may directly communicate with the mobile computing device 200.

As stated above, the user's 102 location may be determined through the mobile device location detection system 610. The mobile device location detection system 610 outputs a position signal that identifies where the user 102 is located. The mobile computing device 200 may be configured to send via the mobile device transceiver 608 the position signal output from the mobile device location detection system 610 to the server 202.

Thus steps 1012 and 1014 show that as the user 102 arrives at the pickup location 108, where the autonomous vehicle 104 is also located, the server 202 will detect that the position signal of the mobile device location detection system 610 is similar to and/or within a threshold distance from the pickup location 108 and the position signal of the autonomous vehicle location detection system 514. The server 202 may then notify the autonomous vehicle 104 that the user 102 is near the autonomous vehicle 104.

Alternatively, the mobile computing device 200 may communicate directly with the autonomous vehicle 104. For example, a near-field communication (NFC) system or other wireless technology, such as Bluetooth, may be used to provide direct communication between the mobile computing device 200 and the autonomous vehicle 104.

In step 1016, when the autonomous vehicle 104 is aware that the user 102 is nearby, either by a notification from the server 202, by direct communication with the mobile computing device 200 of the user 102, or by any other method of communication, the autonomous vehicle computing system 502 will cause the autonomous vehicle audio system 516 to output the first audible authentication signal 204a.

In step 1018, the user 102 verifies the first audible authentication signal 204a against the earlier received second audible authentication signal 204b. In step 1020, the user 102 may then use the mobile computing device 200 to notify the server 202 and/or the autonomous vehicle 104 directly through the support application 606 and/or by sending a notification or signal through the mobile device transceiver 608. Alternatively, the user 102 and/or the mobile computing device 200 of the user 102 may instead output the second audible authentication signal 204b so that the autonomous vehicle 104 receives the second audible authentication signal 204b. The autonomous vehicle 104 may then either verify onboard the first audible authentication signal 204a against the second audible authentication signal 204b or send the first and second audible authentication signals 204a, 204b to the server 202, where the pairing system 706 determines whether the signals 204a, 204b match. The server communication system 712 then notifies the autonomous vehicle 104 of a successful authentication.

Step 1022 illustrates that in response to the successful authentication of the first and second audible authentication signals 204a, 204b, the autonomous vehicle control system 510 allows entry to the autonomous vehicle 104 and the user 102 accordingly boards the autonomous vehicle 104. It is further contemplated that the autonomous vehicle 104 may previously have had doors locked to prevent entry thereto; thus, when the autonomous vehicle 104 allows entry thereto, the doors may be unlocked.

FIG. 10 is simply one example in a wide variety of different methods that fall within the scope of this disclosure. One of ordinary skill in the art would understand that modifications to ordering, timing, components, and/or other processes would fall within the scope of this disclosure.

Figure 11:
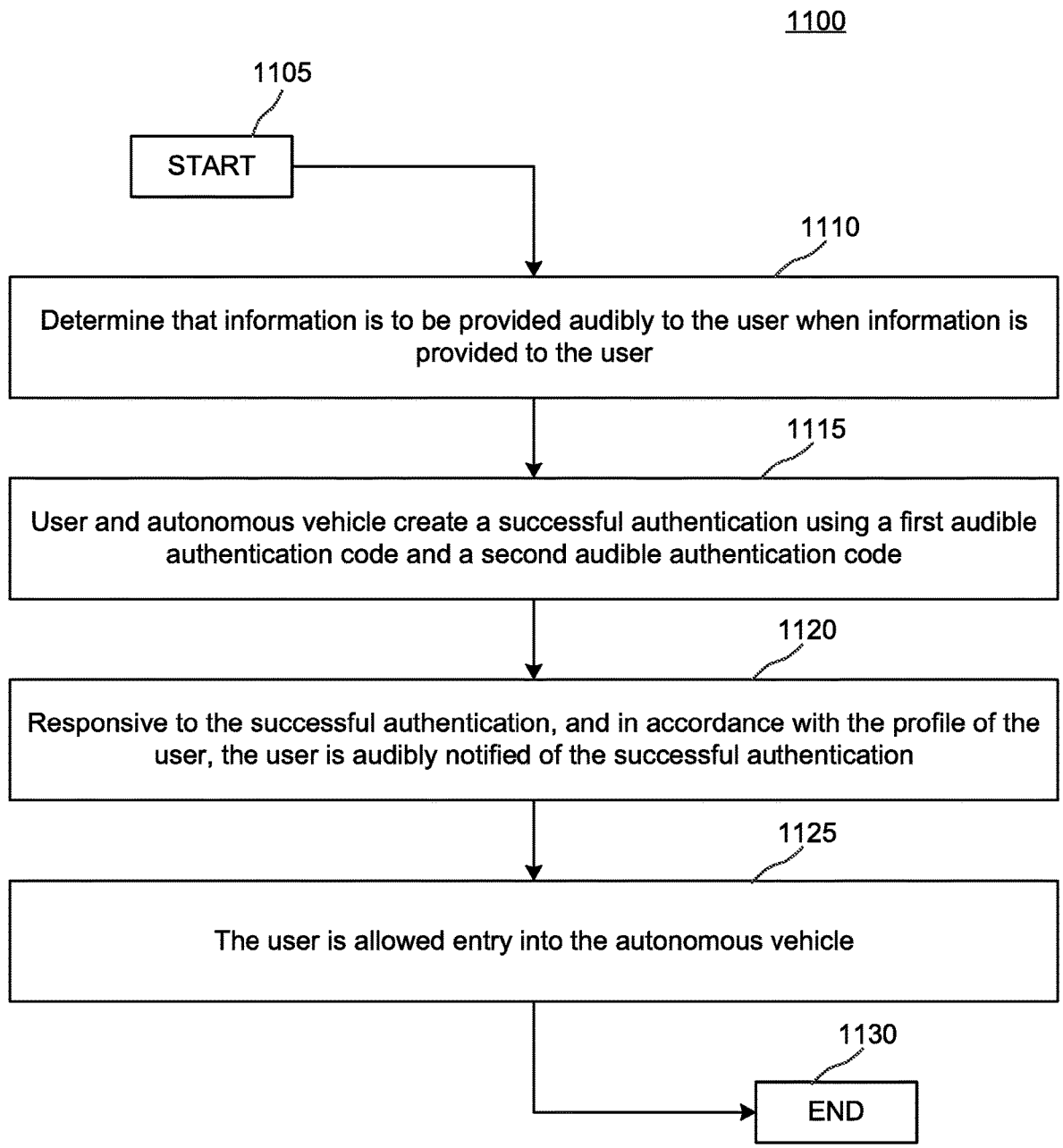
FIG. 11 is a schematic block diagram that illustrates a pickup process.

FIG. 11 illustrates a schematic block diagram of a procedure 1100 for boarding the autonomous vehicle 104. Procedure 1100 begins with step 1105, and continues to step 1110 where the autonomous vehicle 104 determines that information is to be provided audibly to the user 102 when information is provided to the user 102.

Procedure 1100 continues to step 1115 where the user 102 and the autonomous vehicle 104 create a successful authentication using the first audible authentication code 204a and the second audible authentication code 204b. The successful authentication may be created in a wide variety of methods, as discussed above.

At step 1120, responsive to the successful authentication, and in accordance with the profile of the user 102, the user 102 is audibly notified of the successful authentication. It is to be clear that any of the above-identified audio systems or communication systems may be used to audibly notify the user 102, including but not limited to the autonomous vehicle audio system 516, the mobile device audio system 612, and/or the server communication system 712.

The user 102 is then allowed entry into the autonomous vehicle at step 1125. The process subsequently adds at step 1130.

Part 2: En Route

After the user 102 has boarded the autonomous vehicle 104, the autonomous vehicle 104 and the user 102 may begin the journey.

Figure 12:
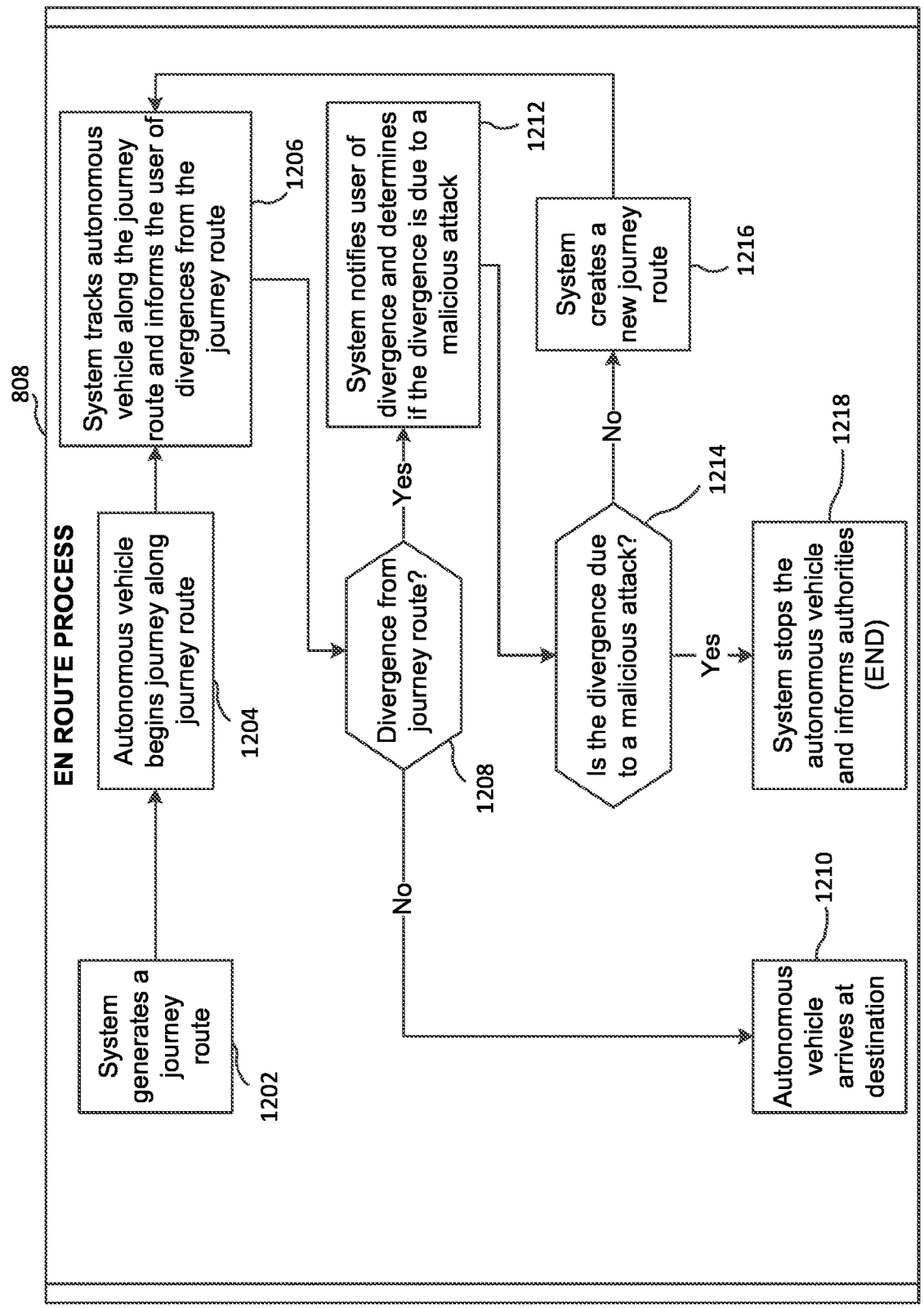
FIG. 12 is a flow diagram that illustrates a journey verification process in FIG. 8.

FIG. 12 illustrates the en route process 808.

As shown in step 1202, to ensure that the user 102 to the intended destination 402, the server 202 may use the route planning system 708 to create the predetermined journey route 302. The server 202 communicates the predetermined journey route 302 to the autonomous vehicle 104. Alternatively or additionally, the autonomous vehicle 104 may have a locally stored route planning system to create the predetermined journey route 302 and the locally generated predetermined journey route 302 may be transmitted to the server 202 (e.g., the verification system 710).

In step 1204 and 1206, the autonomous vehicle 104 begins moving along the predetermined journey route 302. During the journey, the autonomous vehicle location detection system 514 outputs the position signal of the autonomous vehicle 104. The server communication system 712 may receive the position signal output, store the position signal output in the data store 714, and use the position signal output in the verification system 710. Alternatively or additionally, the mobile device location detection system 610 may also output the position signal output of the mobile device 200, which allows the server communication system 712 to similarly receive the position signal output, store the position signal output in the data store 714, and use the position signal output in the verification system 710.

Steps 1206 and step 1208 show the verification system detecting divergences 306 from the predetermined journey route 302. More specifically, the verification system 710 compares the position signal output of the autonomous vehicle 104 and/or the mobile computing device 200 against the predetermined journey route 302. The position signal output of the autonomous vehicle 104 creates the actual journey route 304, which may or may not be substantially similar to the predetermined journey route 302.

Step 1210 shows that if the actual journey route 304 is substantially similar to the predetermined journey route 302, then the autonomous vehicle 104 will arrive at the destination 402 as planned.

On the other hand, if the actual journey route 304 is not substantially similar to and/or exceeds a threshold distance away from the predetermined journey route 302, then there is the divergence 306.

Step 1212 then shows that the user 102 is notified of the divergence 306. More specifically, the verification system 710 of the server 202 may communicate with the server communication system 712 to send a signal to the mobile device transceiver 608. The mobile computing device 200 processes the signal from the mobile device transceiver 608 and may notify the user 102 through the support application 606 or any other suitable method. Alternatively or additionally, the autonomous vehicle 104 may announce the divergence through the autonomous vehicle audio system 516. In either instances, the audio systems 516, 612 output the support message 308, which explains that divergence 306 has occurred.

Step 1214 shows that when the divergence 306 is detected, the server 202 may further determine and/or authenticate the cause of the divergence 306. This determination and/or authentication may be achieved through a wide variety of different methods according to this subject disclosure.

One such method is comparing the position signal outputs of the autonomous vehicle 104 and the position signal outputs of the mobile computing device 200 of the user 102. When the position signal outputs differ significantly, there is a possibility that the autonomous vehicle 104 and/or the mobile computing device 200 has been maliciously attacked. In other words, the autonomous vehicle and/or the mobile computing device 200 may be compromised to cause the location detection systems 508, 610 to output inaccurate position signals (i.e. spoofing).

Another method is comparing the actual journey route 304 against journey routes or paths of other nearby autonomous vehicles 104a. If the actual journey route 304 differs significantly against other journey routes of other autonomous vehicles 104a, there is a possibility that the autonomous vehicle 104 has been malicious attacked. In other words, when the autonomous vehicle 104 makes a divergence 306 from the predetermined journey route 302 that other autonomous vehicles 104a do not also do or follow, the autonomous vehicle 104 may be compromised such that the propulsion system 522, braking system 524, and/or steering system 526 no longer follow routing instructions from the server 202. Thus, a third party may have control of the autonomous vehicle 104, resulting in actions not requested and/or implemented by the user 102 and/or the server 202. In some scenarios, the server 202 and/or the autonomous vehicle 104 may communicate with other autonomous vehicles 104 and/or other sensors nearby to determine whether unusual changes. These sensors may include, but are not limited to, other trusted autonomous vehicles 104, cameras as part of infrastructure, other government and non-government infrastructure, etc.

While both methods may provide information of the possibility of a malicious attack, there may be situations in which a malicious attack may be determined, when in reality there is no malicious attack (i.e. a false positive malicious attack). To remedy this, a combination of the above identified methods and/or any other different method may be useful to authenticate the presence of a malicious attack.

While the above methods are specifically identified, other methods are also contemplated and within this subject disclosure. For example, in areas having an infrastructure designed with transceivers or other wireless capabilities (i.e. "smart city"), the server 202 and/or the autonomous vehicle 104 may communicate with the city to determine whether other autonomous vehicles 104a are making similar pathing decisions or if there are new traffic developments, such as construction, flooding, etc.

Step 1216 shows that if the verification system 710 determines that the divergence 306 is not caused by a malicious attack, the verification system 710 communicates with the route planning system 708 to create a new journey route, which becomes the predetermined journey route 302. In other words, if the verification system 710 determines that the autonomous vehicle 104 diverges 306 from the predetermined journey path 302 due to an innocent cause (e.g., missed a turn, could not switch lanes, etc.) then the route planning system 708 reroutes the autonomous vehicle 104 to the destination 402, despite the divergence 306. In some embodiments, the autonomous vehicle 104 may detect the divergence 306 and request a new journey route from the server 202, which will respond by having the route planning system 708 create a new journey route that becomes the new predetermined journey route 302. It is further contemplated that the verification system 710 may further determine the cause of the divergence 306 and, in accordance with the profile of the user, cause the autonomous vehicle audio system 516 or the mobile device audio system 612 to audibly notify the user 102 of the cause of the divergence 306. For example, the verification system 710 may determine that construction has caused a road in the predetermined journey route to be closed; thus the verification system 710 communicates with the mobile device audio system 612 via the support application 606 to output an audible message stating that the divergence 306 (or turn away from the street) is due to a road closure caused by construction.

After receiving the new predetermined journey route 302, the verification system 710 again tracks the progress of the autonomous vehicle 104 and/or the mobile computing device 200 along the predetermined journey route 302 for divergences 306 from the predetermined journey route 302. If the actual journey route 304 is identical to the predetermined journey route 302, then the autonomous vehicle 104 and the user 102 will arrive at the destination 402.

Otherwise, as shown in step 1218, if the verification system 710 has determined that there is a malicious attack, the server communication system 712 sends instructions to the autonomous vehicle 104 to stop and/or pull over. The server 202 may also be configured to send a notification or otherwise inform authorities and/or other emergency services of the malicious attack, the position of the user 102 and the autonomous vehicle 104.

Alternatively or additionally, the mobile computing device 200 may be configured to also compare the progress of the autonomous vehicle 104 and/or the mobile computing device 200 along the predetermined journey route 302. If the divergence 306 occurs, the mobile computing device 200 may be configured to request information regarding the divergence from the server 202 and/or the autonomous vehicle 104. The verification system 710 may then respond with the information. In the event of a malicious attack, the user 102 may then contact authorities and/or other people on their own or may request through the support application 606 to have the server 202 and/or the autonomous vehicle 104 contact authorities and/or other resources.

It is further contemplated that the verification system 710 may also be configured to cause the autonomous vehicle audio system 516 and/or the mobile device audio system 612 to, in accordance with the user's profile, audibly output each turn along the predetermined journey path 302, irrespective of whether there is any divergence 306.

It is further contemplated that, in some embodiments, the user 102 may want to change the destination 402 while enroute. Thus, the user 102 may speak to the microphone 518 of the autonomous vehicle 104 and/or the mobile computing device 200 to ask for the change. The autonomous vehicle 104 may then send the request to the route planning system 708, which will create a new journey path and update the predetermined journey path 302 with the new journey path. Again, the user 102 may be notified audibly of the change. In some embodiments, the user 102 may also want to add stops and/or quick destinations along the journey to the destination 402. Again, the user 102 may speak to the microphone 518 of the autonomous vehicle 104 and/or the mobile computing device 200 to ask for the addition. The autonomous vehicle 104 may then send the request to the route planning system 708, which will create a new journey path with the additional stops and update the predetermined journey path 302 with the new journey path.

Figure 13:
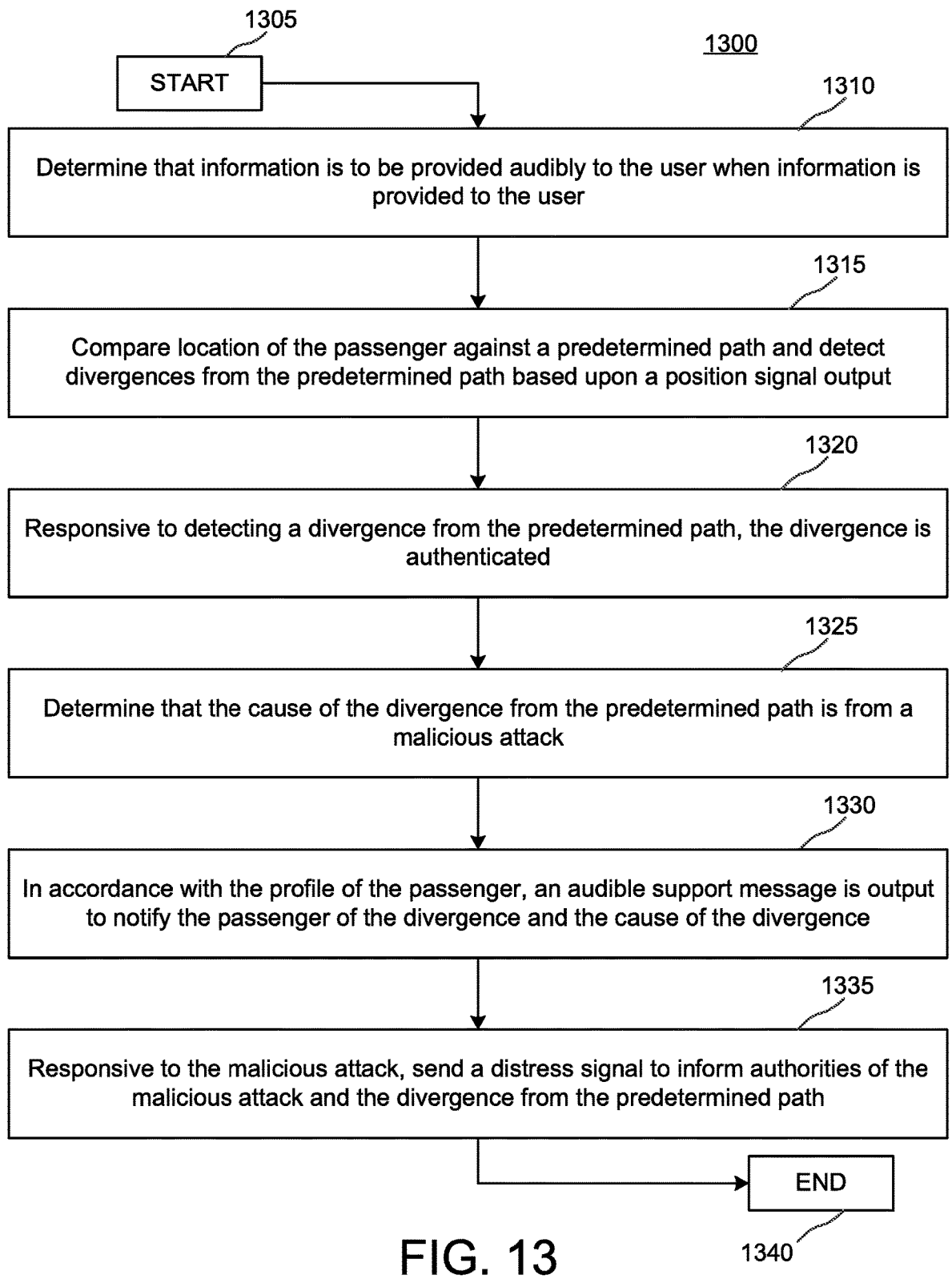
FIG. 13 is a schematic block diagram that illustrates an enroute process.

FIG. 13 is a schematic block diagram of a procedure 1300 for boarding the autonomous vehicle 104. Procedure 1300 begins with step 1305, and continues to step 1310 where it is determined that information is to be provided audibly to the user 102 when information is provided to the user 102.

Procedure 1300 continues to step 1315 where a location of the passenger 102 is compared against the predetermined journey path 302. The comparison may detect the divergence 306 from the predetermined journey path based upon the position signal output by the autonomous vehicle 104 and/or the mobile computing device 200.

At step 1320, responsive to detecting the divergence 306 from the predetermined journey path 302, the divergence 306 is authenticated. As stated above, the divergence 306 may be authenticated in a wide variety of different methods to determine whether there is actually a divergence 306 from the predetermined journey path 302 and the cause of the divergence 306. For example, the divergence 306 may be authenticated by comparing a location of the autonomous vehicle against a location of a second autonomous vehicle that is trusted. In some embodiments, the second autonomous vehicle acts just as a sensor, in that the second autonomous vehicle is able to determine the location of the autonomous vehicle 104. In some embodiments, there may be multiple additional autonomous vehicles, all of which may be able to determine the behavior and location of the autonomous vehicle 104.

Procedure 1300 continues to step 1325, where the cause of the divergence 306 from the predetermined journey path 302 is determined to be from a malicious attack. As stated above, there are a wide variety of different methods to determine whether the divergence 306 is caused by a malicious attack.

At step 1330, in accordance with the profile of the user 102, the autonomous vehicle audio system 516 and/or the mobile device audio system 612 outputs the support message 308 to notify the passenger of the divergence and the cause of the divergence.

Then at step 1335, responsive to the malicious attack, a distress signal is sent to inform authorities of the malicious attack and the divergence 306 from the predetermined journey path 302. Again, the distress signal may be sent from the mobile computing device 200 of the user, the server 202, and/or the autonomous vehicle 104. The procedure 1300 subsequently ends at step 1340.

Part 3: Disembarking

Assuming the user 102 and the autonomous vehicle 104 arrive at the intended destination 402, there may be a disembarking process 810.

Figure 14:
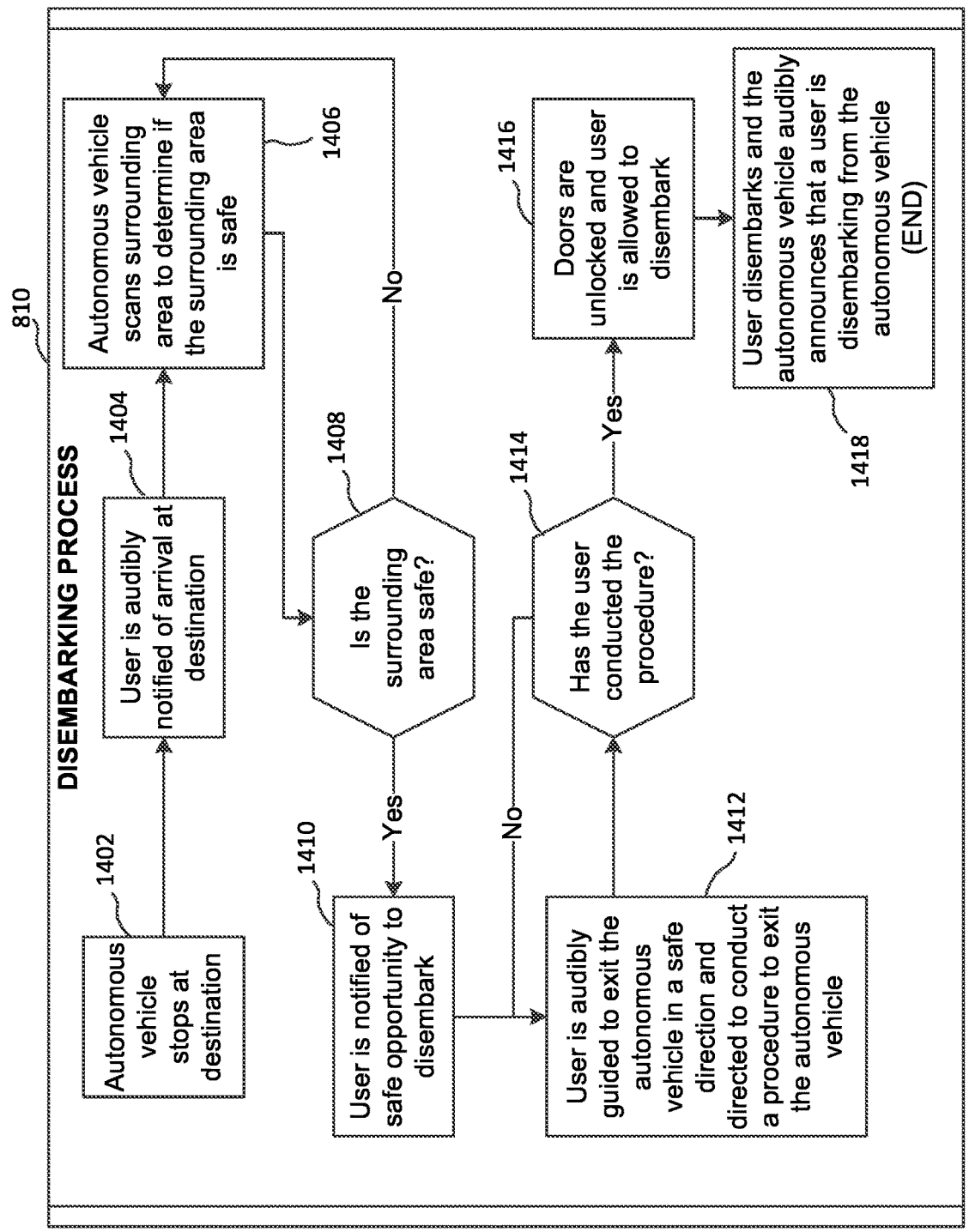
FIG. 14 is a flow diagram that illustrates a safe disembarking process in FIG. 8.

FIG. 14 demonstrates one such disembarking process 810.

As discussed above, the autonomous vehicle 104, the server 202 and/or the mobile computing device 200 may be tracking the location of the autonomous vehicle 104 and/or the mobile computing device 200. Thus, as shown in step 1402, upon arrival near the destination 402, the autonomous vehicle 104 will find a safe location to stop the autonomous vehicle 104 and come to a stop. The location may be considered safe based on a wide variety of different factors, such as vehicular traffic, foot traffic, speed of traffic, weather conditions, etc. When the position signal of the autonomous vehicle 104 and/or the position signal of the mobile computing device 200 comes to a stop, the server 202 will compare the stop location against the location of the destination 402.

As step 1404, if the location is substantially similar and/or within a threshold distance, the server communication system sends a notification to the user 102. The notification may be audible and may be communicated through the autonomous vehicle audio system 516 and/or the mobile device audio system 612. The notification may further include details of the location of the autonomous vehicle 104 in relation to the destination 402, which may also allow the user 102 to verify that the destination 402 is the intended destination. For example, the notification may state "We have arrived at a safe location. We are parked 100 feet in front of the post office."

Step 1406 shows that the autonomous vehicle 104 then scans an area around the vehicle and an intended direction for the user 102 to disembark towards. The autonomous vehicle 104 may scan the surrounding area with the autonomous vehicle sensor system 520. For example, an optical camera and/or lidar may be configured to observe obstacles and movement along a sidewalk nearby.

Step 1408 shows the autonomous vehicle 104 determining whether the surrounding area is safe. For example, the autonomous vehicle 104 may determine the surrounding area is not safe because there is the pedestrian 404 is running in the direction of the autonomous vehicle 104, which would create a possibility of the pedestrian hitting the door of the autonomous vehicle 104 when the user 102 opens the door. If the autonomous vehicle 104 determines that the surrounding area is not safe, it continues to scan the surrounding area until there is a safe opportunity for the user 102 to disembark from the autonomous vehicle 104. Many factors may be used to determine whether the surrounding area is safe and/or if there is a safe opportunity for the user 102 to disembark. These factors may include, but are not limited to, the presence and/or absence of pedestrians, animals, high curbs, skateboarders, flooding and/or other obstacles, the speed at which objects are moving, the speed at which the user 102 may be able to disembark (i.e. the amount of time necessary for the user 102 to safely disembark), etc. In some embodiments, the autonomous vehicle 102 may create a prediction of where the objects and/or obstacles will be based on their current positions and velocities and accordingly further determine the safe opportunity, such that the safe opportunity takes into account that no other objects will be entering that area or location when the user 102 may disembark.

Step 1410 shows that when the autonomous vehicle 104 has detected a safe opportunity to disembark, the autonomous vehicle 104 notifies the user that there is a safe opportunity to disembark. Again, this may be accomplished through the autonomous vehicle audio system 516 and/or the mobile device audio system 612.

Step 1412 then shows that the autonomous vehicle 104 may guide the user 102 to exit the vehicle during the safe opportunity to disembark. More specifically, the autonomous vehicle 104 determines directional information to audibly guide disembarking. This directional information may be determined from a wide variety of factors, such as the location of the autonomous vehicle 104, the orientation of the autonomous vehicle 104, a direction of the destination 402 in relation to the autonomous vehicle 104, etc. Again, this information may be audibly provided to the user 102 through the autonomous vehicle audio system 516 and/or the mobile device audio system 612. Furthermore, the autonomous vehicle audio system 516 may be configured to provide spatial audio. In other words, the autonomous vehicle audio system 516 may be configured to output audio from specified directions, such that the user 102 will be able to easily identify the specified direction to disembark from the autonomous vehicle 104. While this may be helpful to users 102 with visual impairments, this spatial audio guidance may also be helpful for all users 102 in general. For example, in camp-style seating arrangements (e.g. seats all facing inwards, such that passengers may easily talk to each other, like around a camp fire), the users 102 may easily forget and/or lose track of which direction is "left" and/or "right." Thus, by spatially providing audible guidance through the autonomous vehicle audio system 516, all users 102 in general would easily understand the correct direction to disembark the autonomous vehicle 104.

In some embodiments, step 1412 further shows that the autonomous vehicle 104 may instruct or direct the user 102 to perform a procedure prior to exiting the autonomous vehicle. For example, the autonomous vehicle 104 may require that the user 102 use the arm distal from the autonomous vehicle 104 door to open the door (i.e. performing a Dutch reach).

Optional step 1414 shows that the autonomous vehicle 104 observes and determines whether the user 102 has conducted the requested procedure. Continuing the earlier example, the autonomous vehicle 104 may observe through an in-cabin camera of the autonomous vehicle sensor system 520 to determine whether the user has performed a Dutch reach to open the door.

If the autonomous vehicle 104 does not observe and/or determines that the user 102 has not conducted the requested procedure, the autonomous vehicle 104 may again instruct or direct the user 102 to perform the procedure. For example, when a sighted user 102 has not performed a Dutch reach, the autonomous vehicle 104 may remain locked and notify the user 102 again to perform a Dutch reach.

At step 1416, if the autonomous vehicle 104 observes and determines that the user 102 has conducted the requested procedure, the autonomous vehicle 104 may then allow the user 102 to disembark from the autonomous vehicle 104 during the safe opportunity. If the safe opportunity is no longer present, the autonomous vehicle 104 may notify the user 102 that the safe opportunity has ended.

At step 1418, as the user 102 disembarks from the autonomous vehicle 104, the autonomous vehicle 104 may, in accordance with the profile of the user 102, output the audible message 406 exterior to the autonomous vehicle 104, the audible message 406 indicating that the user 102 is disembarking from the autonomous vehicle 104. This audible message 406 may be helpful in alerting nearby pedestrians 404 that the disembarking of the user 102 may cause an obstruction in their path.

After the user 102 has disembarked from the autonomous vehicle 104, the server 202 may cause the mobile device audio system 612 to output audible guidance from user's location to the destination 402.

Figure 15:
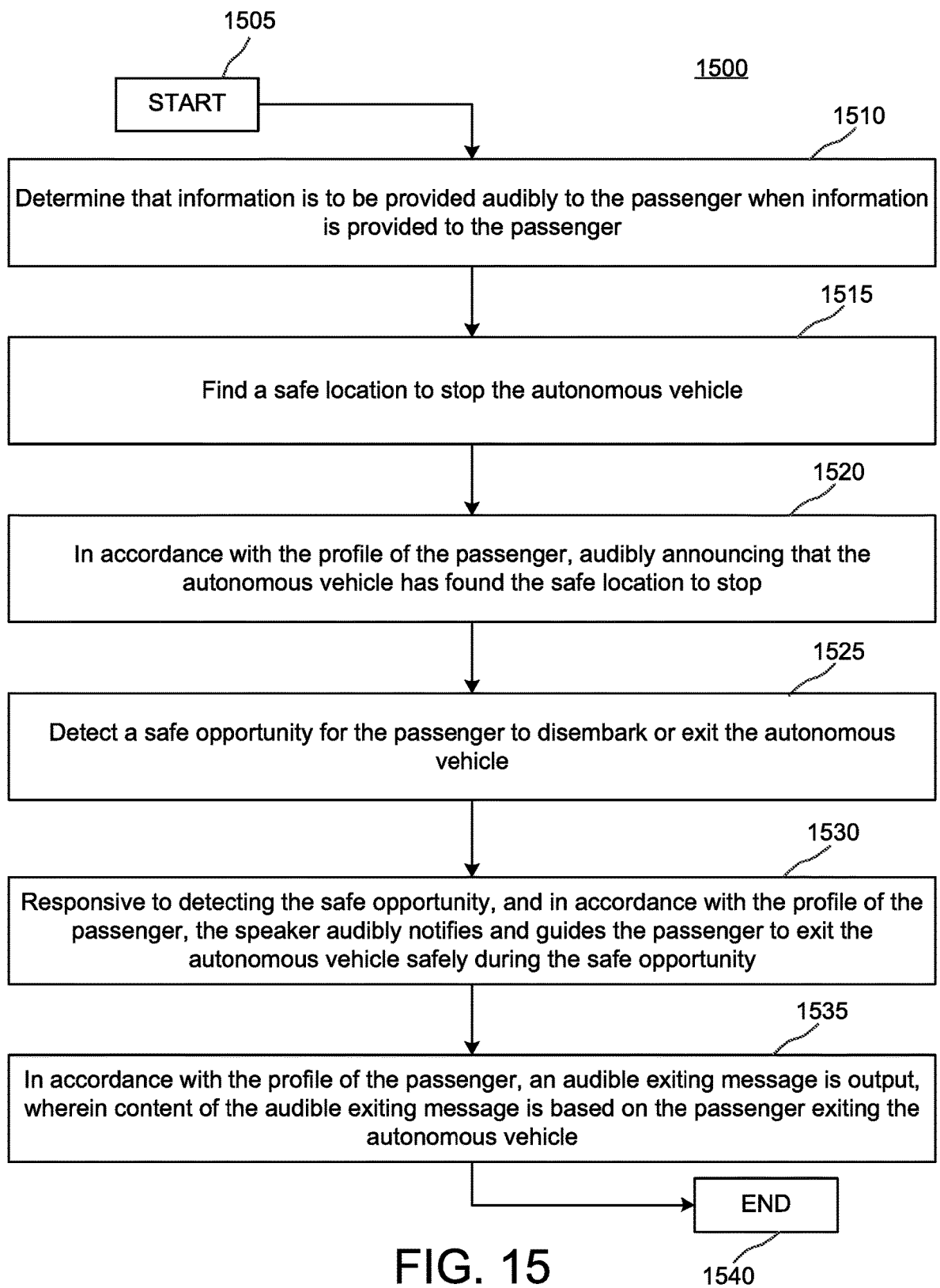
FIG. 15 is a schematic block diagram that illustrates a disembarking process.

FIG. 15 is a schematic block diagram of a procedure 1500 for boarding the autonomous vehicle 104. Procedure 1500 begins with step 1505, and continues to step 1510 where it is determined that information is to be provided audibly to the user 102 when information is provided to the user 102.

Procedure 1500 continues to step 1515 where the autonomous vehicle 104 searches for a safe location to stop the autonomous vehicle 104. The safe location may be directly in front of the destination 402.

At step 1520, in accordance with the profile of the passenger 102, the autonomous vehicle 104 may cause the autonomous vehicle audio system 516 to audibly output that the autonomous vehicle has found the safe location to stop.

Procedure 1500 continues to step 1525, the autonomous vehicle 104 then searches for and attempts to detect a safe opportunity for the passenger to disembark or exit the autonomous vehicle 104. As stated above, the safe opportunity may be determined based on a wide variety of different factors.

At step 1530, responsive to detecting the safe opportunity, and in accordance with the profile of the passenger 102, the autonomous vehicle audio system 516 audibly notifies and guides the passenger 102 to exit the autonomous vehicle 104 safely during the safe opportunity. As stated above, the autonomous vehicle audio system 516 may spatially guide the passenger 102 through directional audio.

Then at step 1535, in accordance with the profile of the passenger 102, the audible message 406 is output, wherein content of the audible message 406 is based on the passenger 102 exiting the autonomous vehicle 104 being disabled. The procedure subsequently ends at step 1540.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Similarly, functionality described herein can be performed on different components. For example, and without limitation, determinations by the verification system 710 may be performed onboard the autonomous vehicle 104 and vice versa.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An autonomous vehicle, comprising:
    a communication system configured for use by a user of the autonomous vehicle; and
    a computing system that is in communication with the communication system, wherein the computing system comprises:
        a processor; and
        memory that stores computer-executable instructions that, when executed by the processor, cause the processor to perform acts comprising:
            sending a location of the autonomous vehicle, the location effective to assist a mobile device to audibly provide guidance from a location of the mobile device to the location of the autonomous vehicle;
            receiving a first audible authentication code of the autonomous vehicle from a server;
            receiving a second audible authentication code of the user;
            authenticating between the user and the autonomous vehicle through the communication system to create a successful authentication,
            wherein the first audible authentication code of the autonomous vehicle and the second audible authentication code of the user match to create the successful authentication.

2. The autonomous vehicle of claim 1, the acts further comprising:
    determining, based upon a profile of the user, that information is to be provided audibly to the user when the information is provided to the user.

3. The autonomous vehicle of claim 1, the acts further comprising:
    causing the communication system to output the first audible authentication code to be received by the user.

4. The autonomous vehicle of claim 1, the acts further comprising:
    causing the communication system to output the first audible authentication code that matches the second audible authentication code that is received by the user to create the successful authentication.

5. The autonomous vehicle of claim 1, the acts further comprising:
    sending the first audible authentication code and the second audible authentication code to the server; and
    responsive to the successful authentication, notifying the server of the successful authentication.

6. The autonomous vehicle of claim 1, the acts further comprising:
    responsive to the successful authentication and in accordance with a profile of the user, causing the communication system to output an audible message to notify the user of the successful authentication.

7. The autonomous vehicle of claim 1, the acts further comprising:
    responsive to the successful authentication, causing a control system of the autonomous vehicle to allow entry to the autonomous vehicle.

8. The autonomous vehicle of claim 1, wherein the communication system is in communication with the server and a mobile computing device of the user, the communication system configured to receive the first audible authentication code of the autonomous vehicle from the server and the second audible authentication code of the user from the mobile computing device of the user.

9. A method comprising:
    determining, based upon a profile of a passenger of an autonomous vehicle, that information is to be provided audibly to the passenger when the information is provided to the passenger;
    sending a position of the autonomous vehicle, the position effective to assist a mobile device to audibly provide guidance to the passenger, the guidance providing a route from a position of the passenger to the autonomous vehicle;
    receiving a first audible authentication code;
    receiving a second audible authentication code; and
    authenticating between the passenger and the autonomous vehicle through a communication system to create a successful authentication.

10. The method of claim 9, wherein the autonomous vehicle outputs the first audible authentication code and receives the second audible authentication code provided by the passenger.

11. The method of claim 9, wherein the autonomous vehicle outputs the first audible authentication code that matches the second audible authentication code that is received by the passenger to create the successful authentication.

12. The method of claim 9, wherein the first audible authentication code of the autonomous vehicle and the second audible authentication code of the passenger match to create the successful authentication.

13. The method of claim 9, further comprising:
    sending the first audible authentication code and the second audible authentication code to a server; and
    responsive to the successful authentication, notifying the server of the successful authentication.

14. The method of claim 9, further comprising:
    responsive to the successful authentication and in accordance with the profile of the passenger, causing the communication system to output an audible message to notify the passenger of the successful authentication.

15. The method of claim 9, further comprising:
responsive to the successful authentication, allowing entry to the autonomous vehicle.

16. A mobile computing device comprising:
a processor; and
memory that stores computer-executable instructions that, when executed by the processor, cause the processor to perform acts comprising:
  providing guidance audibly to a user of the mobile computing device, the guidance including a route from a position of the mobile device to a position of an autonomous vehicle;
  receiving a first audible authentication code;
  receiving a second audible authentication code; and
  authenticating the autonomous vehicle with the mobile computing device to create a successful authentication,
  wherein the successful authentication of the authentication is determined by the first audible authentication code and the second audible authentication code.

17. The mobile computing device of claim 16, the acts further comprising:
determining, based upon a profile of the user, that information is to be provided audibly to the user when information is sent to the user.

18. The mobile computing device of claim 16, further comprising a speaker and a microphone, wherein the speaker is configured to output the first audible authentication code and the microphone is configured to receive the second audible authentication code output by the autonomous vehicle, wherein the successful authentication is created when the first audible authentication code and the second audible authentication code match.

19. The mobile computing device of claim 16, wherein the first audible authentication code is received from the autonomous vehicle and the second audible authentication code is received from a server in communication with the mobile computing device.

20. The mobile computing device of claim 16, the acts further comprising:
responsive to the successful authentication and in accordance with a profile of the user, causing the speaker to output an audible message to notify the user of the successful authentication.

* * * * *